United States Patent
Kitou et al.

(10) Patent No.: US 7,786,644 B2
(45) Date of Patent: Aug. 31, 2010

(54) ELECTRIC ROTARY MACHINE, ARMATURE, METHOD OF MANUFACTURING ELECTRIC ROTARY MACHINE AND MACHINE FOR FORMING ARMATURE

(75) Inventors: Kazuyuki Kitou, Nagoya (JP); Akiyasu Itoh, Anjo (JP); Katsunobu Inoue, Anjo (JP); Eiji Sakai, Anjo (JP); Minoru Fukui, Handa (JP)

(73) Assignee: Denso Corporation, Kariya (JP)

( * ) Notice: Subject to any disclaimer, the term of this patent is extended or adjusted under 35 U.S.C. 154(b) by 920 days.

(21) Appl. No.: 11/598,735

(22) Filed: Nov. 14, 2006

(65) Prior Publication Data

US 2007/0126537 A1    Jun. 7, 2007

(30) Foreign Application Priority Data

Dec. 2, 2005 (JP) .............................. 2005-348687
Dec. 28, 2005 (JP) .............................. 2005-378775

(51) Int. Cl.
*H02K 23/26* (2006.01)
*H02K 3/46* (2006.01)

(52) U.S. Cl. .................... 310/201; 310/260; 310/270

(58) Field of Classification Search ................ 310/201, 310/260, 270; 29/596, 598, 597
See application file for complete search history.

(56) References Cited

U.S. PATENT DOCUMENTS 4,437,230 A * 3/1984 Greutmann .................. 29/597

5,619,088 A * 4/1997 Yumiyama et al. .......... 310/270
6,897,594 B2 * 5/2005 Ichikawa et al. ............ 310/201
2002/0033649 A1 * 3/2002 Oohashi et al. ............. 310/184

FOREIGN PATENT DOCUMENTS

| JP | A-7-31107 | 1/1995 |
| JP | A 8-205446 | 8/1996 |

OTHER PUBLICATIONS

Chinese Office Action issued Feb. 6, 2009.

* cited by examiner

*Primary Examiner*—Quyen Leung
*Assistant Examiner*—Leda Pham
(74) *Attorney, Agent, or Firm*—Oliff & Berridge, PLC

(57) ABSTRACT

An electric rotary machine, an armature for use in the electric machine, a method of forming an electric rotary machine and a forming machine for an armature of an electric rotary machine are disclosed wherein insulator-coated coils are wound in slots of an armature core from which lower and upper layer coil extensions extend and are connected to a commutator. The upper layer coil extension has a contour deformation part at an intersecting region where the lower and upper layer coil extensions intersect with each other to have an insulating distance between the lower and upper layer coil extensions. The forming machine includes a work holder holding the armature, and a forming jig forming a curvature portion on the upper layer coil extension.

18 Claims, 10 Drawing Sheets

ELECTRIC ROTARY MACHINE, ARMATURE, METHOD OF MANUFACTURING ELECTRIC ROTARY MACHINE AND MACHINE FOR FORMING ARMATURE

CROSS REFERENCE TO RELATED APPLICATIONS

This application is based on Japanese Patent Application Nos. 2005-348687, filed on Dec. 2, 2005, and 2005-378775, filed on Dec. 28, 2005, the contents of which are hereby incorporated by reference.

BACKGROUND OF THE INVENTION

1. Technical Field of the Invention

The present invention relates to electric rotary machines having armature coils made of flat type wires and, more particularly to an electric rotary machine, an armature for the electric rotary machine, a method of manufacturing the electric rotary machine and a forming machine for the armature of the electric rotary machine.

2. Description of the Related Art

In recent years, an electric rotary machine (especially a starter) for installation on a vehicle requires an effort to minimize a structure with lightweight aimed at decreasing an installation space and improving fuel consumption. To achieve such an aim, an attempt is made to provide a model an armature coil adopting a flat type wire to provide an improved lamination rate with an increase in output torque for thereby achieving the miniaturization of an armature with lightweight.

However, it is well known that the flat type wire has a narrower creeping distance between upper and lower coils at an intersecting region where the upper and lower coils intersect with each other than that of a round wire with a difficulty encountered in ensuring a safety insulating distance. Additionally, the flat type wire is hard to have a coil set (especially in the long side direction of the wire), causing an issue to arise in ensuring an insulating distance between the upper and lower coils at the intersecting region where the upper and lower coils intersect with each other.

To address such an issue, U.S. Pat. No. 5,619,088 proposes an armature for an electric rotary machine. As shown in FIG. 7, the armature has a lower coil extension 100 and an upper coil extension 200 that intersect with each other. The lower coil extension 100 and the upper coil extension 200 are formed with cutout (stepped) portions 110, 210, respectively, at an intersection region where the lower and upper coil extensions 100, 200 intersect with each other, thereby ensuring an insulating gap between these coil extensions 100, 200.

With such a related art structure, press punching intermediate areas of the lower coil extension 100 and the upper coil extension 200 at the intersection region allows the cutout portions 110, 210 to be formed. With the cutout portions 110, 210 formed by press punching, burrs are formed at edges of the cutout portions 110, 210. These burrs are feared of causing damage to insulation layers of the coils with the resultant occurrence of short-circuiting. When an attempt is made to deburr, the number of man-hour increases with the resultant increase in manufacturing cost.

Further, press punching the lower coil extension 100 and the upper coil extension 200 to form the cutout (stepped) portions 110, 210 causes the insulation films to be peeled off from the lower coil extension 100 and the upper coil extension 200, respectively. This results in an increase of short-circuiting.

The number of coils to be subjected to press punching ranges from approximately 100 to 200 pieces. Thus, many number of press punching operations needs to be carried out with an increased load born by a press die, with a fear of shortening of die life.

Further, the burrs caused during press punching remain on the coils with adverse affects caused in subsequent steps.

Furthermore, the burrs, occurring during press punching, fly apart in equipment, resulting in an increase in labor hour for cleaning equipment.

With a view to addressing the occurrence of short-circuiting, large number of interlayer insulating sheets needs to be disposed between the lower coil extensions 100 and the upper coil extensions 200. This causes an increase in the number of component parts and production equipment becomes complicated in structure.

SUMMARY OF THE INVENTION

The present invention has been completed with a view to addressing the issues mentioned above and has an object to an electric rotary machine, an armature for the electric rotary machine, a method of manufacturing the electric rotary machine and a forming machine for the armature of the electric rotary machine wherein an insulating distance can be provided between upper and lower layer coil extensions at an intersecting region thereof without forming stepped portions on the upper and lower layer coil extensions at areas intersecting with each other and causing insulation films from being peeled off from the upper and lower layer coil extensions.

To achieve the above object, one aspect of the present invention provides an electric rotary machine comprising a yoke carrying thereon a plurality of permanent magnets, and an armature core, fixedly supported on an armature shaft and rotatably disposed in the yoke, which has an outer periphery formed with a plurality of slots. A plurality of insulator-coated armature coils are wound in the slots of the armature core in multiple layers, each of which includes a flat type wire formed in lower and upper layer coils disposed in each of the slots in lower and upper layers. A commutator is fixedly supported on the armature shaft at one end thereof and having a plurality of conductor segments equidistantly disposed on an outer periphery of the armature shaft in a circumferential direction thereof, the conductor segments including risers, respectively, to each of which the lower and upper layer coils are electrically connected. The lower and upper layer coils include a lower layer coil extension and an upper layer coil extension extracted from each of the slots of the armature core, respectively, and at least one of the lower and upper layer coil extensions includes a contour deformation part, formed in an area at an intersecting region where the lower layer coil extension and the upper layer coil extension intersect with each other, to create an insulating distance between the lower layer coil extension and the upper layer coil extension at the intersecting region thereof.

With such a structure mentioned above, since at least one of the lower and upper layer coil extensions includes the contour deformation part formed in the area at the intersecting region where the lower layer coil extension and the upper layer coil extension intersect with each other, the insulating distance can be provided between the lower layer coil extension and the upper layer coil extension at the intersecting region thereof. This makes it possible to adopt a thick flat type wire, that is, a flat type wire with an increased vertical length for a coil of an armature of an electric rotary machine, enabling a design of the electric rotary machine having a minimized structure with lightweight.

Further, with the structure stated above, the upper and lower layer coil extensions have no need to include the cutout portions (stepped portions) formed in areas at the intersection region, where the upper and lower layer coil extensions intersect with each other, by press punching operations as required in the related art described above. Therefore, the upper and lower layer coil extensions have no burrs resulting from press punching operations and no need arises to execute operations to deburr, making it possible to achieve reduction of man-hour.

With the electric rotary machine of the present embodiment, the riser of each slot may have a riser slot that accommodates therein distal ends of the lower and upper layer coil extensions in the upper and lower layers with the distal ends of the lower and upper layer coil extensions having opposing surfaces covered with insulating films, respectively, which are melted by fusing to allow the distal ends of the lower and upper layer coil extensions to be electrically and mechanically bonded to each other.

With such a structure mentioned above, the upper and lower layer coil extensions have distal ends that are inserted to the slot of the riser of the conductor segment forming part of the commutator with no need arising to preliminarily peel off insulating layers from the distal ends of the associated coil extensions. Thus, the upper and lower layer coil extensions can have a widened minimal clearance at the intersecting region where the upper and lower layer coil extensions intersect with each other. Therefore, no need arises for making a coil set on a flat type wire for the purpose of getting an adequate insulating gap between both the upper and lower layer coil extensions.

Further, the presence of the upper and lower layer coil extensions, covered with the insulating films at the intersecting region where the upper and lower layer coil extensions become closest to each other, enables only a slight amount of the insulating gap to be provided between the upper and lower layer coil extensions. Thus, stable quality can be obtained in insulation between both the upper and lower layer coil extensions without causing an interlayer insulating sheet to be placed between both the associated coil extensions.

With the electric rotary machine of the present embodiment, the contour deformation part of at least one of the lower and upper layer coil extensions may include a twisted portion formed in the area at the intersecting region where the lower layer coil extension and the upper layer coil extension intersect with each other.

With such a structure mentioned above, since the contour deformation part of at least one of the lower and upper layer coil extensions is formed of the twisted portion, the contour deformation part can take the form of a simplified structure without causing any increase in cost of the electric rotary machine. Also, the presence of the contour deformation part formed of the twisted portion allows an outer periphery of the armature to be formed in a compact configuration without causing an increase in a radial direction of the armature. Therefore, the electric rotary machine can be formed in a minimized structure without causing a reduction in an effective cross-sectional area of the flat type wire forming the armature coil.

With the electric rotary machine of the present embodiment, the contour deformation part of at least one of the lower and upper layer coil extensions may include a curvature portion formed in the area at the intersecting region where the lower layer coil extension and the upper layer coil extension intersect with each other.

With such a structure mentioned above, since the contour deformation part of at least one of the lower and upper layer coil extensions is formed of the curvature portion, the contour deformation part takes the form of a simplified structure without causing any increase in cost of the electric rotary machine. Also, the presence of the contour deformation part formed of the curvature portion allows an outer periphery of the armature to be formed in a compact configuration without causing an increase in a radial direction of the armature. Therefore, the electric rotary machine can be formed in a minimized structure without causing a reduction in an effective cross-sectional area of the flat type wire forming the armature coil.

With the electric rotary machine of the present embodiment, the lower layer coil extension may have a cross-sectional area substantially equal to cross-sectional areas of the lower layer coil extension in fore and aft areas thereof at the intersecting region where the lower layer coil extension and the upper layer coil extension intersect with each other.

With such a structure mentioned above, the lower layer coil extension and the upper layer coil extension have no need to be formed with the stepped portion with no remarkable reduction in cross-sectional area of each coil extension. That is, the lower layer coil extension has a cross-sectional area substantially equal to cross-sectional areas of the lower layer coil extension in fore and aft areas thereof at the intersecting region where the lower layer coil extension and the upper layer coil extension intersect with each other. Likewise, the upper layer coil extension has a cross-sectional area substantially equal to cross-sectional areas of the upper layer coil extension in fore and aft areas thereof at the intersecting region where the upper layer coil extension intersects with the lower layer coil extension. Thus, no remarkable reduction takes place in cross-sectional areas of both the coil extensions at the intersecting region thereof, thereby making it possible to make a design of an electric rotary machine that can suppress an increase of heat values and deterioration in power output while having an excellent heat resistant.

With the electric rotary machine of the present embodiment, the flat type wire for each of the armature coils may be formed by a drawing step.

In implementing metal rolling of a round wire into a flat type wire, work hardening is caused to occur in the flat type wire resulting in a difficulty of forming the contour deformation part on the flat type wire. In contrast to such metal rolling, forming the flat type wire by the drawing step results in less work hardening, making it easy to form the contour deformation part of the coil.

With the electric rotary machine of the present embodiment, the twisted portion of at least one of the lower and upper layer coil extensions may have a cross-sectional area having a major axis inclined at a given acute angle with respect to a major axis of a cross-sectional area of the other one of the lower and upper layer coil extensions.

With such a structure mentioned above, since the twisted portion of at least one of the lower and upper layer coil extensions is inclined with respect to a major axis of a cross-sectional area of the other one of the lower and upper layer coil extensions, the contour deformation part can be formed in a simplified structure without causing an electric rotary machine to be formed in a complicated structure.

With the electric rotary machine of the present embodiment, the curvature portion of at least one of the lower and upper layer coil extensions may include a plastically deformed portion formed on at least one of the lower and upper layer coil extensions in a curved shape.

With such a structure set forth above, due to the presence of the curvature portion composed of the plastically deformed portion, no insulating film is peeled off from the curvature portion. Accordingly, the upper and lower layer coil extensions have no need to ensure an unduly increased insulating distance between the associated coil extensions. Additionally, the curvature portion can be shaped in a configuration with minimal deformation, resulting in a reduction of stress caused in at least one of the associated coil extensions.

According to another aspect of the present invention, there is provided an armature for an electric rotary machine, which comprises an armature shaft, an armature core, fixedly supported on the armature shaft and adapted to be rotatable within the electric rotary machine, which has an outer periphery formed with a plurality of slots, a plurality of insulator-coated armature coils, wound in the slots of the armature core in multiple layers, each of which includes a flat type wire formed in lower and upper layer coils disposed in each of the slots in lower and upper layers, and a commutator fixedly supported on the armature shaft at one end thereof and having a plurality of conductor segments equidistantly disposed on an outer periphery of the armature shaft in a circumferential direction thereof, the conductor segments including risers, respectively, to each of which the lower and upper layer coils are electrically connected. The lower and upper layer coils include a lower layer coil extension and an upper layer coil extension extracted from each of the slots of the armature core, respectively, and at least one of the lower and upper layer coil extensions includes a contour deformation part, formed in an area at an intersecting region where the lower layer coil extension and the upper layer coil extension intersect with each other, to create an insulating distance between the lower layer coil extension and the upper layer coil extension at the intersecting region thereof.

With such a structure mentioned above, since at least one of the lower and upper layer coil extensions includes the contour deformation part formed in the area at the intersecting region where the lower layer coil extension and the upper layer coil extension intersect with each other, an adequate insulating distance can be ensured between the lower layer coil extension and the upper layer coil extension at the intersecting region thereof. This makes it possible to adopt a thick flat type wire, that is, a flat type wire with an increased vertical length for a coil of an armature of an electric rotary machine, enabling a design of the electric rotary machine having a minimized structure with lightweight.

Further, with the structure stated above, the upper and lower layer coil extensions have no need to include the cutout portions (stepped portions) formed in areas at the intersection region, where the upper and lower layer coil extensions intersect with each other, by press punching operations as required in the related art described above. Therefore, the upper and lower layer coil extensions have no burrs resulting from press punching operations and no need arises to execute operations to deburr, making it possible to achieve reduction of manhour.

With armature for the electric rotary machine according to the present invention, riser of each slot may have a riser slot that accommodates therein distal ends of the lower and upper layer coil extensions in the upper and lower layers with the distal ends of the lower and upper layer coil extensions having opposing surfaces covered with insulating films, respectively, which are melted by fusing to allow the distal ends of the lower and upper layer coil extensions to be electrically and mechanically bonded to each other.

With such a structure mentioned above, the upper and lower layer coil extensions have distal ends that are inserted to the slot of the riser of the conductor segment forming part of the commutator with no need arising to preliminarily peel off insulating layers from the distal ends of the associated coil extensions. Thus, the upper and lower layer coil extensions can have a widened minimal clearance at the intersecting region where the upper and lower layer coil extensions intersect with each other. Therefore, no need arises for making a coil set on a flat type wire for the purpose of getting an adequate insulating gap between both the upper and lower layer coil extensions.

Further, the presence of the upper and lower layer coil extensions, covered with the insulating films at the intersecting region where the upper and lower layer coil extensions become closest to each other, enables only a slight amount of the insulating gap to be provided between the upper and lower layer coil extensions. Thus, stable quality can be obtained in insulation between both the upper and lower layer coil extensions without causing an interlayer insulating sheet to be placed between both the associated coil extensions.

With the armature for the electric rotary machine according to the present invention, the contour deformation part of at least one of the lower and upper layer coil extensions may include a twisted portion formed in the area at the intersecting region where the lower layer coil extension and the upper layer coil extension intersect with each other.

With such a structure mentioned above, since the contour deformation part of at least one of the lower and upper layer coil extensions is formed of the twisted portion, the contour deformation part takes the form of a simplified structure without causing any increase in cost of the electric rotary machine. Also, the presence of the contour deformation part formed of the twisted portion allows an outer periphery of the armature to be formed in a compact configuration without causing an increase in a radial direction of the armature. Therefore, the electric rotary machine can be formed in a minimized structure without causing a reduction in an effective cross-sectional area of the flat type wire forming the armature coil.

With the armature for the electric rotary machine according to the present invention, the contour deformation part of at least one of the lower and upper layer coil extensions includes a curvature portion formed in the area at the intersecting region where the lower layer coil extension and the upper layer coil extension intersect with each other.

With such a structure mentioned above, since the contour deformation part of at least one of the lower and upper layer coil extensions is formed of the curvature portion, the contour deformation part takes the form of a simplified structure without causing any increase in cost of the electric rotary machine. Also, the presence of the contour deformation part formed of the curvature portion allows an outer periphery of the armature to be formed in a compact configuration without causing an increase in a radial direction of the armature. Therefore, the electric rotary machine can be formed in a minimized structure without causing a reduction in an effective cross-sectional area of the flat type wire forming the armature coil.

With the armature for the electric rotary machine according to the present invention, the lower layer coil extension may have a cross-sectional area substantially equal to cross-sectional areas of the lower layer coil extension in fore and aft areas thereof at the intersecting region where the lower layer coil extension and the upper layer coil extension intersect with each other.

With such a structure mentioned above, the lower layer coil extension and the upper layer coil extension have no need to be formed with the stepped portion with no remarkable reduction in cross-sectional area of each coil extension. That is, the lower layer coil extension has a cross-sectional area substantially equal to cross-sectional areas of the lower layer coil extension in fore and aft areas thereof at the intersecting region where the lower layer coil extension and the upper layer coil extension intersect with each other. Likewise, the upper layer coil extension has a cross-sectional area substantially equal to cross-sectional areas of the upper layer coil extension in fore and aft areas thereof at the intersecting region where the upper layer coil extension intersects with the lower layer coil extension. Thus, no remarkable reduction takes place in cross-sectional areas of both the coil extensions at the intersecting region thereof, thereby making it possible to make a design of an electric rotary machine that can suppress an increase of heat values and deterioration in power output while having an excellent heat resistant.

With the armature for the electric rotary machine according to the present invention, the flat type wire for each of the armature coils may be formed by a drawing step.

In implementing metal rolling of a round wire into a flat type wire, work hardening is caused to occur in the flat type wire resulting in a difficulty of forming the contour deformation part on the flat type wire. In contrast to such metal rolling, forming the flat type wire by the drawing step results in less work hardening, making it easy to form the contour deformation part of the coil.

With the armature for the electric rotary machine according to the present invention, the twisted portion of at least one of the lower and upper layer coil extensions has a cross-sectional area having a major axis inclined at a given acute angle with respect to a major axis of a cross-sectional area of the other one of the lower and upper layer coil extensions.

With such a structure set forth above, since the twisted portion of at least one of the lower and upper layer coil extensions is inclined with respect to a major axis of a cross-sectional area of the other one of the lower and upper layer coil extensions, the contour deformation part can be formed in a simplified structure without causing an electric rotary machine to be formed in a complicated structure.

With the armature for the electric rotary machine according to the present invention, the curvature portion of at least one of the lower and upper layer coil extensions may include a plastically deformed portion formed on at least one of the lower and upper layer coil extensions in a curved shape.

With such a structure set forth above, due to the presence of the curvature portion composed of the plastically deformed portion, no insulating film is peeled off from the curvature portion. Accordingly, the upper and lower layer coil extensions have no need to ensure an unduly increased insulating distance between the associated coil extensions. Additionally, the curvature portion can be shaped in a configuration with minimal deformation, resulting in a reduction of stress caused in at least one of the associated coil extensions.

According to another aspect of the present invention, there is provided a method of manufacturing an electric rotary machine, which comprises preparing an armature core, fixedly supported on an armature shaft and having an outer periphery formed with a plurality of slots, and a commutator carried on the armature shaft in face-to-face relationship with the armature core, the commutator including a plurality of conductor segments, circumferentially placed in equidistantly spaced positions, which have risers, respectively, and winding a plurality of upper and lower insulator-coated coils in the slots of the armature core in multiple layers such that the upper and lower insulator-coated coils are disposed in each of the slots in upper and lower layers. The upper and lower insulator-coated coils are from the slots of the armature core as upper and lower layer coil extensions, respectively, and a contour deformation part is formed in at least one of the lower and upper layer coil extensions in an area at an intersecting region where the lower layer coil extension and the upper layer coil extension intersect with each other to create an insulating distance between the lower layer coil extension and the upper layer coil extension. Distal ends of the lower and upper layer coil extensions are electrically connected to each rise of the conductor segments of the commutator.

With such a method of manufacturing the electric rotary machine according to the present invention, since the armature forming method includes step of forming the contour deformation part in the area at the intersecting region where the lower layer coil extension and the upper layer coil extension intersect with each other, an adequate insulating distance can be easily and reliably ensured between the lower layer coil extension and the upper layer coil extension at the intersecting region thereof. By so doing, it becomes possible for a thick flat type wire, that is, a flat type wire with an increased vertical length to be employed for a coil of an armature of an electric rotary machine. This results in capability of making a design of the electric rotary machine having a minimized structure with lightweight.

Further, with such an armature forming method stated above, the upper and lower layer coil extensions have no need to include the cutout portions (stepped portions) formed in areas at the intersection region, where the upper and lower layer coil extensions intersect with each other, by press punching operations as required in the related art described above. Therefore, the upper and lower layer coil extensions have no burrs resulting from press punching operations and no need arises to execute operations to deburr, making it possible to achieve reduction of man-hour.

With the method of manufacturing the electric rotary machine according to the present invention, the riser of each slot may have a riser slot that accommodates therein distal ends of the lower and upper layer coil extensions in the upper and lower layers with the distal ends of the lower and upper layer coil extensions having opposing surfaces covered with insulating films, respectively, which are melted by fusing to allow the distal ends of the lower and upper layer coil extensions to be electrically and mechanically bonded to each other.

With such a method of manufacturing the electric rotary machine according to the present invention, the upper and lower layer coil extensions have distal ends that are inserted to the slot of the riser of the conductor segment forming part of the commutator with no need arising to preliminarily peel off insulating layers from the distal ends of the associated coil extensions. Thus, the upper and lower layer coil extensions can have a widened minimal clearance at the intersecting region where the upper and lower layer coil extensions intersect with each other. Therefore, no need arises for making a coil set on a flat type wire for the purpose of getting an adequate insulating gap between both the upper and lower layer coil extensions.

Further, the presence of the upper and lower layer coil extensions, covered with the insulating films at the intersecting region where the upper and lower layer coil extensions become closest to each other, enables only a slight amount of the insulating gap to be provided between the upper and lower layer coil extensions. Thus, stable quality can be obtained in insulation between both the upper and lower layer coil extensions without causing an interlayer insulating sheet to be placed between both the associated coil extensions.

With the method of manufacturing the electric rotary machine according to the present invention, the contour deformation part of at least one of the lower and upper layer coil extensions may include a twisted portion formed in the area at the intersecting region where the lower layer coil extension and the upper layer coil extension intersect with each other.

With such an armature forming method mentioned above, since the contour deformation part of at least one of the lower and upper layer coil extensions is formed of the twisted portion, the contour deformation part takes the form of a simplified structure without causing any increase in cost of the electric rotary machine. Also, the presence of the contour deformation part formed of the twisted portion allows an outer periphery of the armature to be formed in a compact configuration without causing an increase in a radial direction of the armature. Therefore, the machine can be formed in a minimized structure without causing a reduction in an effective cross-sectional area of the flat type wire forming the armature coil.

With the method of manufacturing the electric rotary machine according to the present invention, the contour deformation part of at least one of the lower and upper layer coil extensions includes a curvature portion formed in the area at the intersecting region where the lower layer coil extension and the upper layer coil extension intersect with each other.

With such an armature forming method mentioned above, since the contour deformation part of at least one of the lower and upper layer coil extensions is formed of the curvature portion, the contour deformation part takes the form of a simplified structure without causing any increase in cost of the armature. Also, the presence of the contour deformation part formed of the curvature portion allows an outer periphery of the armature to be formed in a compact configuration without causing an increase in a radial direction of the armature. Therefore, the armature can be formed in a minimized structure without causing a reduction in an effective cross-sectional area of the flat type wire forming the armature coil.

With the method of manufacturing the electric rotary machine according to the present invention, the lower layer coil extension has a cross-sectional area substantially equal to cross-sectional areas of the lower layer coil extension in fore and aft areas thereof at the intersecting region where the lower layer coil extension and the upper layer coil extension intersect with each other.

With such an armature forming method mentioned above, the lower layer coil extension and the upper layer coil extension have no need to be formed with the stepped portion with no remarkable reduction in cross-sectional area of each coil extension. That is, the lower layer coil extension has a cross-sectional area substantially equal to cross-sectional areas of the lower layer coil extension in fore and aft areas thereof at the intersecting region where the lower layer coil extension and the upper layer coil extension intersect with each other. Likewise, the upper layer coil extension has a cross-sectional area substantially equal to cross-sectional areas of the upper layer coil extension in fore and aft areas thereof at the intersecting region where the upper layer coil extension intersects with the lower layer coil extension. Thus, no remarkable reduction takes place in cross-sectional areas of both the coil extensions at the intersecting region thereof, thereby making it possible to make a design of an armature that can suppress an increase of heat values and deterioration in power output while having an excellent heat resistant.

With the method of manufacturing the electric rotary machine according to the present invention, the flat type wire of each of the upper and lower insulator-coated coils is formed by a drawing step.

When a round wire is rolled into a flat type wire, work hardening is caused to occur in the flat type wire resulting in a difficulty of forming the contour deformation part on the flat type wire. In contrast to such metal rolling, forming the flat type wire by the drawing step results in less work hardening, making it easy to form the contour deformation part of the coil.

With the method of manufacturing the electric rotary machine according to the present invention, the twisted portion of at least one of the lower and upper layer coil extensions may have a cross-sectional area having a major axis inclined at a given acute angle with respect to a major axis of a cross-sectional area of the other one of the lower and upper layer coil extensions.

With such an armature forming method mentioned above, since the twisted portion of at least one of the lower and upper layer coil extensions is inclined with respect to a major axis of a cross-sectional area of the other one of the lower and upper layer coil extensions, the contour deformation part can be formed in a simplified structure without causing an armature to be formed in a complicated structure. This also results in a reduction of the number of component parts of the armature with a decrease in manufacturing cost.

With the method of manufacturing the electric rotary machine according to the present invention, the curvature portion of at least one of the lower and upper layer coil extensions may include a plastically deformed portion formed on at least one of the lower and upper layer coil extensions in a curved shape.

With such an armature forming method mentioned above, since the curvature portion is composed of the plastically deformed portion, no insulating film is peeled off from the curvature portion. Accordingly, the upper and lower layer coil extensions have no need to ensure an unduly increased insulating distance between the associated coil extensions. Also, the curvature portion can be shaped in a configuration with minimal deformation, resulting in a reduction of stress caused in at least one of the associated coil extensions.

According to another aspect of the present invention, there is provided a forming machine for an armature of an electric rotary machine. The armature has an armature shaft, and an armature core fixedly supported on the armature shaft and rotatably disposed in the electric rotary machine while having an outer periphery formed with a plurality of slots. A plurality of insulator-coated armature coils is wound in the slots of the armature core in multiple layers with each including a flat type wire formed in lower and upper layer coils disposed in each of the slots in lower and upper layers. A commutator is fixedly supported on the armature shaft at one end thereof and having a plurality of conductor segments equidistantly disposed on an outer periphery of the armature shaft in a circumferential direction thereof. The conductor segments include risers, respectively, to each of which the lower and upper layer coils are electrically connected. The lower and upper layer coils include a lower layer coil extension and an upper layer coil extension extracted from each of the slots of the armature core, respectively. At least one of the lower and upper layer coil extensions includes a contour deformation part, formed in an area at an intersecting region where the lower layer coil extension and the upper layer coil extension intersect with each other, to create an insulating distance between the lower layer coil extension and the upper layer coil extension at the intersecting region thereof. The forming machine comprises a work holder mechanism operative to hold the armature core in a given position, a coil restraint ring operative to be placed on the outer periphery of the armature core to restrain an outer periphery of the upper layer coil extension on a stage immediately extracted from the slot of the armature core. A forming jig is operative to be inserted to a clearance between the upper and lower layer coil extensions axially extracted from the slot of the armature core and including a forming portion to form the contour deformation part on at least one of the lower and upper layer coil extensions. A press punch is operative to press an outer periphery of at least one of the lower and upper layer coil extensions against the forming portion.

With such a structure set forth above, the contour deformation part can be formed with the shape of the forming jig in an efficient fashion.

Further, the coil restraint ring can restrain an outer peripheral wall of the upper layer coil extension at an area immediately after the upper layer coil extension is extracted from the associated slot of the armature core in an axial direction thereof. This prevents the upper layer coil extension from lifting in a radially outward direction due to reactive force thereof that would be otherwise caused during operation of the press punch being pressed against the forming portion of the forming jig. This results in capability of preventing the upper layer coil extension from short-circuiting with the armature core. Also, the contour deformation part can be formed in a precise shape in a highly reliable fashion.

With the forming machine for the armature of the electric rotary machine according to the present invention, the forming jig may comprise an insertion tongue, adapted to be inserted to the clearance between the upper and lower layer coil extensions and formed with the forming portion, which has both sides formed with wall surfaces between which a coil insertion recess is formed to accommodate and retain the upper layer coil extension in a fixed place.

With such a structure set forth above, the insertion tongue can be inserted to the clearance between the upper and lower layer coil extensions and has the forming portion which has both sides formed with wall surfaces between which a coil insertion recess is formed, the upper layer coil extension can be accommodate in the coil insertion recess to retain the upper layer coil extension in a fixed place in a highly reliable fashion. That is, when forming the contour deformation part on the upper layer coil extension, the upper layer coil extension can be held in a stable attitude, enabling the contour deformation part on the upper layer coil extension in a highly reliable manner.

With the forming machine for the armature of the electric rotary machine according to the present invention, the insertion tongue may have a tapered guide wall that decrease in radial thickness from a tip portion of the forming portion toward a distal end thereof.

With such a structure set forth above, the provision of the insertion tongue formed in the tapered guide wall allows the insertion tongue to be inserted to the clearance between the lower and upper coil extensions with less contact resistance with the upper layer coil extension. Thus, the insertion tongue can be inserted to the clearance between the lower and upper coil extensions, resulting in an increased efficiency of forming work.

With the forming machine for the armature of the electric rotary machine according to the present invention, the press punch may have a distal end formed in an R-shape with respect to a longitudinal axis of the upper layer coil extension and a given width with respect to widthwise direction of the upper layer coil extension.

With such a structure set forth above, during operation of the press punch to press the upper layer coil extension, the press punch can be brought into contact with the upper layer coil extension in a minimized contact surface area. This suppresses deterioration in an insulating film covering the upper layer coil extension. Also, the provision of the press punch having the distal end formed in the R-shape can suppress the occurrence of stress concentration at the distal end of the press punch. This enables the prevention of crack or chip of the press punch, providing a prolonged operating life.

With the forming machine for the armature of the electric rotary machine according to the present invention, the width of the press punch may be determined to be equal to or slightly greater than a width of the upper layer coil extension.

With such a structure set forth above, the press punch can be pressed against an overall width of the upper layer coil extension, thereby enabling the prevention of partial deformation of the upper layer coil extension while avoiding deterioration of the insulating film of the upper layer coil extension.

With the forming machine for the armature of the electric rotary machine according to the present invention, the forming jig may have an outer periphery formed with a punch guide recess to guide the press punch to a given position on the upper layer coil extension.

With such a structure set forth above, the positioning of the press punch can be accomplished in an easy and reliable fashion, enabling the upper layer coil extension to be formed with the contour deformation part in a stable fashion.

With the forming machine for the armature of the electric rotary machine according to the present invention, an inner jig may be mounted in the forming jig for restricting an inner periphery of the lower layer coil extension.

With such a structure stated above, the forming jig is inserted to between the upper and lower layer coil extensions, the lower layer coil extension can be prevented from bending radially inward. This results in reliable operation to form the contour deformation part of the upper layer coil extension in a highly efficient manner,

DETAILED DESCRIPTION OF PREFERRED EMBODIMENTS

Figure 1:
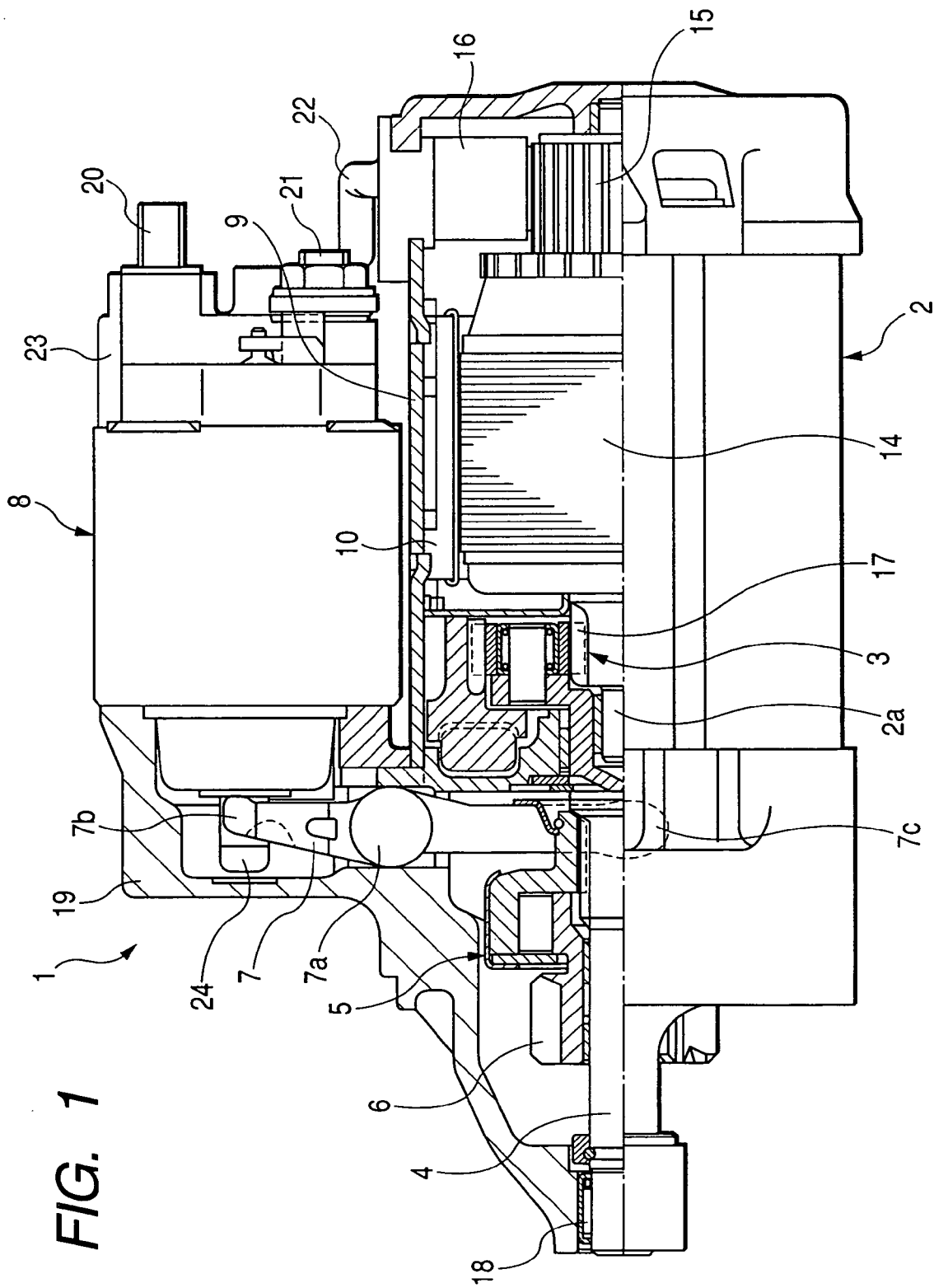
FIG. 1 is a cross-sectional view in half of a starter incorporating an electric rotary machine of a first embodiment according to the present invention.

Now, electric rotary machines of various embodiments according to the present invention and related method are described below in detail with reference to the accompanying drawings. However, the present invention is construed not to be limited to such embodiments described below and technical concepts of the present invention may be implemented in combination with other known technologies or the other technology having functions equivalent to such known technologies.

In the following description, like reference characters designate like or corresponding parts throughout the several views. Also in the following description, the same component parts of a second embodiment as those of a first embodiment are omitted, but it will be appreciated that the same component parts of the second embodiment as those of the first embodiment are referred to those of the first embodiments through the use of like reference characters.

First Embodiment

Figure 2:
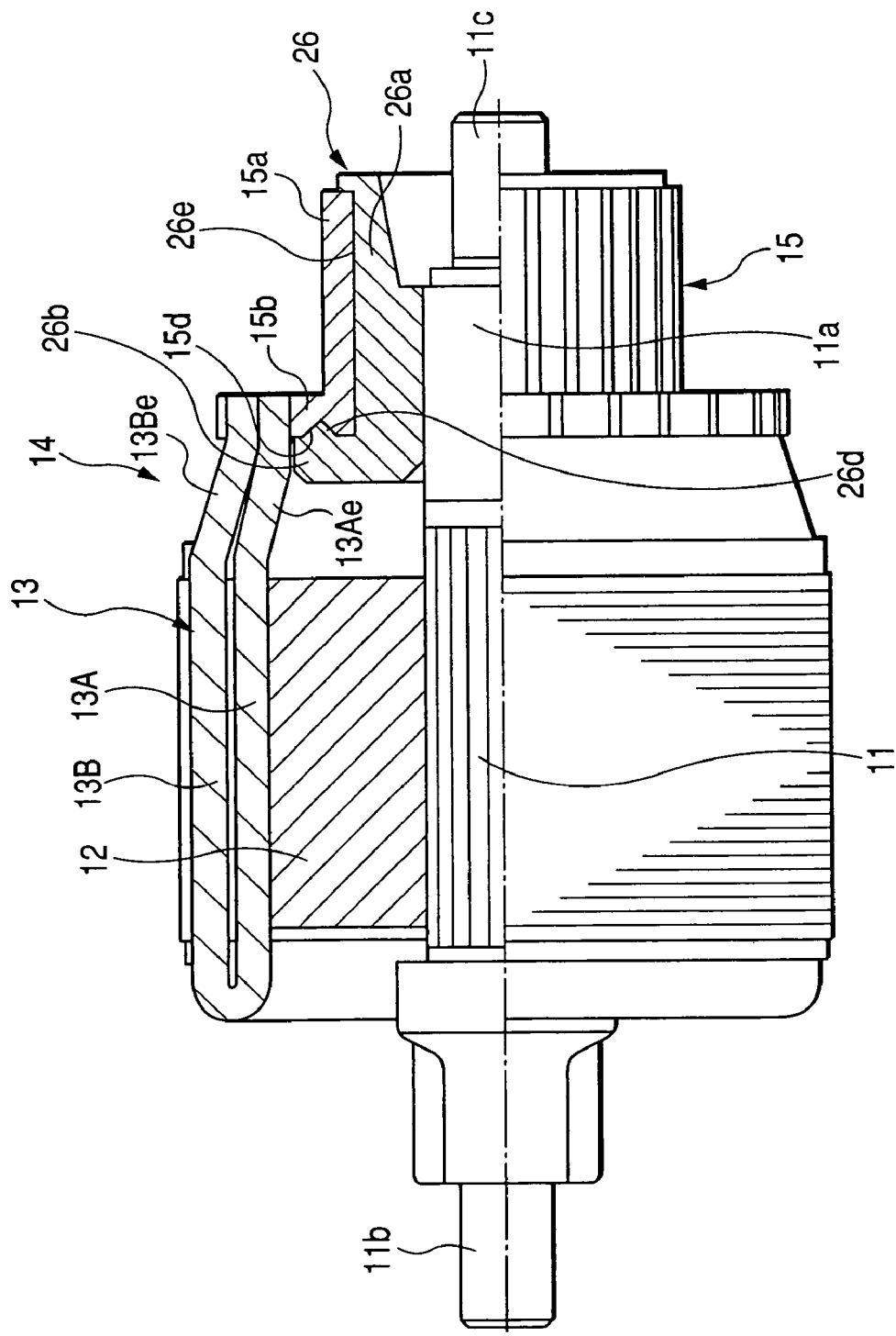
FIG. 2 is a cross-sectional view in half of an armature of the electric rotary machine of the first embodiment shown in FIG. 1.

Now, a starter 1 is described below in detail as an electric rotary machine of a first embodiment according to the present invention with reference to the accompanying drawings. FIG. 1 is a view showing the starter 1 in cross-section in an upper half part thereof and FIG. 2 is a view showing a an armature 14 in cross-section in an upper half part thereof.

As shown in FIG. 1, the starter 1 of the first embodiment is comprised of a motor 2 operative to generate drive torque, a gear reduction unit 3 reducing a rotational speed of the motor 2, an output shaft 4 placed in concentric relation with a motor shaft 2a of the motor 2 to receive drive torque from the motor 2 via the gear reduction unit 3, a pinion gear 6 formed on an outer periphery of the output shaft 4 to be unitary therewith, and an electromagnetic switch 8 placed in parallel to the motor 2 and operative to actuate a shift lever 7 with which the a clutch 5 and the pinion gear 6 are moved forward (leftward as viewed in FIG. 1) in opposition to the motor 2. The electromagnetic switch 8 is also operative to open or close a main contact (described later) incorporated in an energizing circuit (hereinafter referred to as a motor circuit).

The motor 2 includes a DC motor that is comprised of a cylindrical yoke 9 having an inner periphery on which a plurality of permanent magnets 10 is fixedly mounted to form a magnetic flux field, the armature 14 having an armature shaft 11 fixedly carrying thereon an armature core 12 on which an armature coil 13 is wound and which is rotatably supported in an area inside inner peripheries of the permanent magnets 10, and a plurality of carbon brushes 16 for supplying the armature 14 with electric power from a battery (not shown).

The gear reduction unit 3 includes a planetary type gear reduction unit that enables gear reduction on an axis concentric with the armature shaft 11 to transfer orbital motions of planetary gears 17 to the output shaft 4.

The output shaft 4 is placed in concentric relationship with the armature shaft 11 and has a front end rotatably supported with a housing 19 via a bearing 18 and a rear end coupled to the gear reduction unit 3.

The clutch 5 is spline coupled to an outer periphery of the output shaft 4 and operative to transfer drive torque of the output shaft 4 to the pinion gear 6 during startup of an engine. Further, the clutch 5 includes a one-way clutch configured in structure wherein when the pinion gear 6 is caused to rotate by the engine, that is, when a rotational speed of the pinion gear 6 exceeds a rotational speed of the output shaft 4, power transfer between the output shaft 4 and the pinion gear 6 is interrupted so as to prevent the rotation of the pinion gear 6 from being transmitted to the output shaft 4.

The pinion gear 6 is mounted on the clutch 5 at one side thereof in opposition to the motor 2 and is axially movable forward on the output shaft 4 together with the clutch 5 in a unitary fashion to be brought into meshing engagement with a rig gear (not shown) of the engine upon which the rotational force, transferred via the clutch 5, is transmitted to the ring gear.

The electromagnetic switch 8 is comprised of an electromagnetic coil (not shown) energized in response to electric power supplied from a on-vehicle battery when a starter switch is closed, and a plunger (not shown) that is axially movable within an inner periphery of the electromagnetic coil 13. As the electromagnetic coil is energized to form an electromagnet, the electromagnet attracts the plunger to close the main contact. Further, as the electromagnetic coil is de-energized to deactivate an attraction force of the electromagnet, the plunger is restored to its original position due to a reaction force of a return spring (not shown), thereby opening the main contact.

The main contact is comprised of one set of stationary contacts (not shown), connected to the motor circuit via two terminal bolts 20, 21, and a movable contact (not shown) adapted to be movable with the plunger in a unitary fashion for connection to or disconnection from the stationary contacts.

The two terminal bolts 20, 21 includes a B-terminal bolt 20 connected to the on-vehicle battery via a battery cable, and an M-terminal bolt 21 connected to a lead wire 22 extracted from the motor 2, with both terminals being fixedly secured to a contact cover 23 of the electromagnetic switch 8.

The shift lever 7 has a lever fulcrum 7a swingably supported on the housing 19 and one lever end portion 7b, extending upward from the lever fulcrum 7a, which is coupled to a shifting rod 24 mounted on the plunger of the electromagnetic switch 8. The lever 7 has the other lever end portion 7c, extending downward from the lever fulcrum 7a, which is held in engagement with the clutch 5 for transferring a motion of the plunger to the clutch 5. That is, as the electromagnet attracts the plunger to cause the same to move rightward as viewed in FIG. 1, the lever end portion 7b coupled to the shifting rod 24 is pulled by the plunger and moved rightward. This allows the lever end portion 7c, held in engagement with the clutch 5, to swing about a center of the lever fulcrum 7a, causing the clutch 5 to be pushed out forward, that is, rightward as viewed in FIG. 1 in a direction opposite to the motor 2.

Next, the armature coil 13 forming part of the starter 1 according to the present invention is described below.

The armature coil 13 is comprised of a plurality of insulator-coated flat type wires wound in slots 25 (see FIG. 5), formed on an outer periphery of the armature core 12, in multiple layers. In particular, each flat type wire is formed in upper and lower coils 13B, 13A that are inserted to an inside of each slot 25 in upper and lower layers. The lower and upper layer coil extensions 13Ae, 13Be have lower and upper layer coil extensions 13Ae, 13Be, respectively, with distal ends 13a, 13b thereof connected to a commutator 15. Also, the flat type wire is formed by a drawing process with less work hardening and inserted to the slot 25 with a major axis of the flat type wire aligned in a radial direction of the armature core 12.

As shown in FIG. 2, the armature shaft 11 has a rear end 11a fixedly supporting a cylindrical insulating member 26. The commutator 15 is comprised of a plurality of conductor segments 15a fixedly disposed on an outer periphery of the insulating member 26 at circumferentially equidistant positions in a cylindrical profile.

More particularly, the cylindrical insulating member 26 is comprised of a cylindrical portion 26a carried on the rear end 11a of the armature shaft 11, a radially outwardly extending front annular flange 26b, formed on a front end of the cylindrical portion 26a, and a radially outwardly extending rear annular flange 26c formed on a rear end of the cylindrical portion 26a. Moreover, the front annular flange 26b has a rear surface formed with an annular ridge portion 26d, shaped in a triangular configuration in cross section, which is held in mating engagement with annular recesses 15d formed at front ends of the conductor segments 15a. The cylindrical portion 26a of the insulating member 26 has an outer circumferential wall 26e on which the conductor segments 15a are fixedly mounted.

Figure 3:
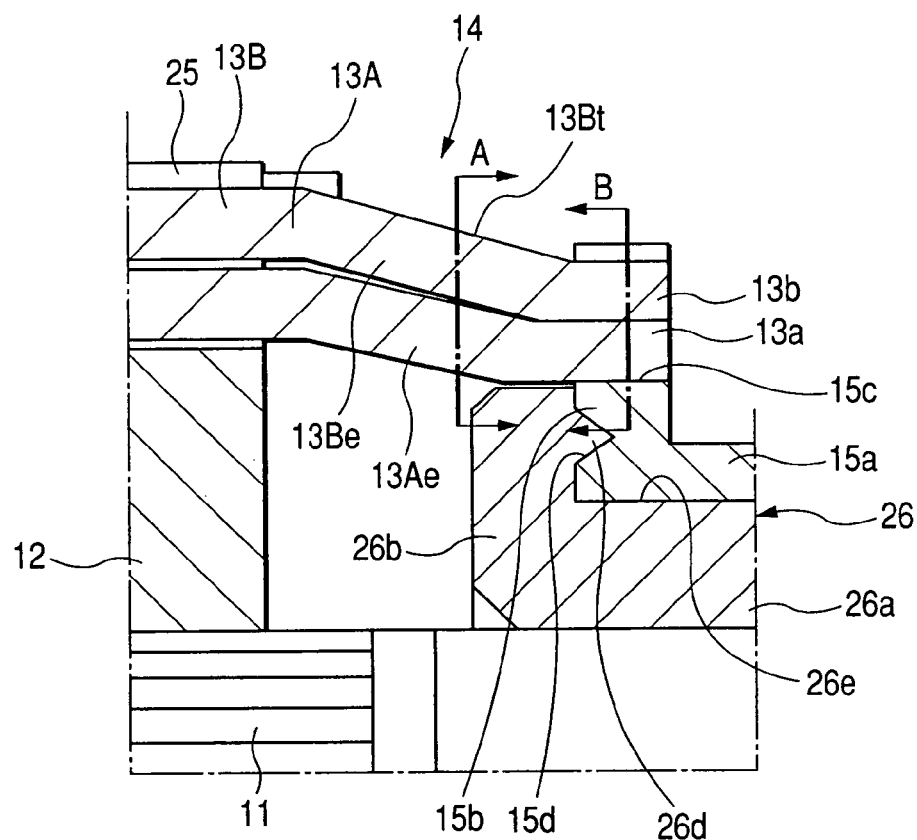
FIG. 3 is an enlarged cross-sectional view of the armature shown in FIG. 2
Figure 6A:
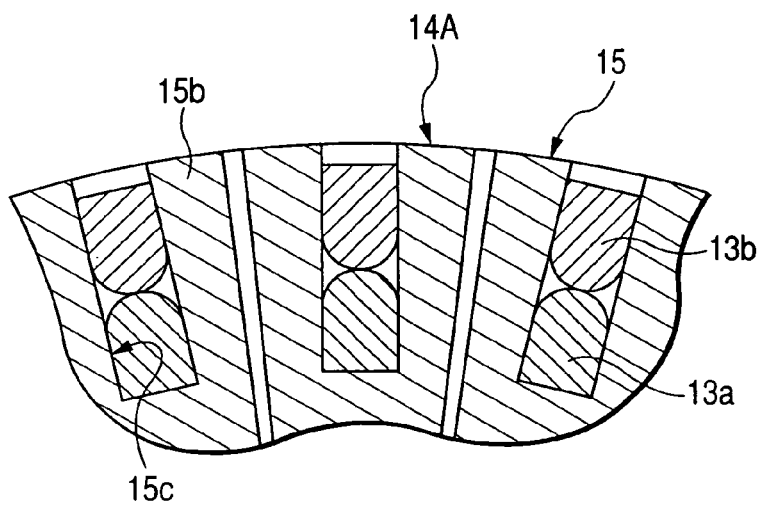
FIG. 6A is an enlarged cross-sectional view, taken on line B-B of FIG. 3, of the armature shown in FIG. 3.
Figure 6B:
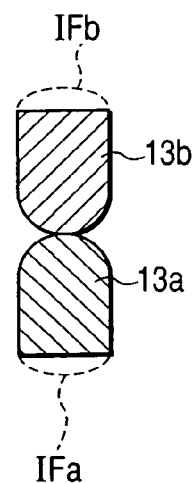
FIG. 6B is a cross-sectional view of distal ends of the upper and lower layer coil extensions forming part of a modified form of the armature of the first embodiment.
Figure 7:
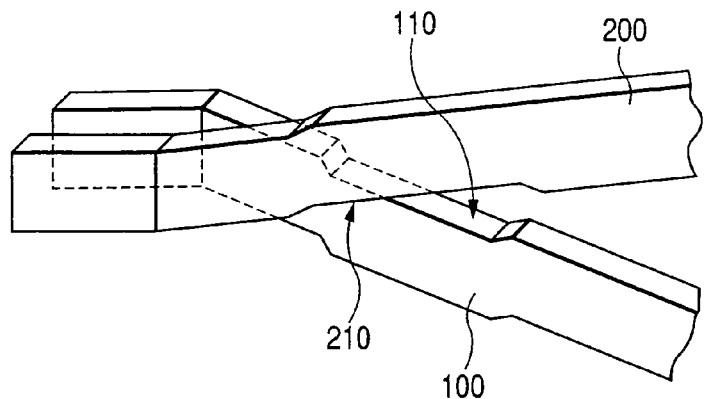
FIG. 7 is a perspective view of upper and lower layer coil extensions forming part of an armature of an electric rotary machine of the related art.

As best shown in FIG. 3, the conductor segment 15a is formed in a longitudinal bar shape in cross section and has a front end formed with a riser 15b, extending in a radially outward direction, which has a radially extending slot 15c for insertion of distal ends 13a, 13b of the lower and upper layer coil extensions 13Ae, 13Be (see FIGS. 6A and 6B).

Also, in the following description, the flat type wire inserted to a lower layer of the slot 25 is referred to as the lower layer coil 13A. Likewise, another flat type wire inserted to the upper layer of the slot 25 is referred to as the upper layer coil 13A.

Figure 5:
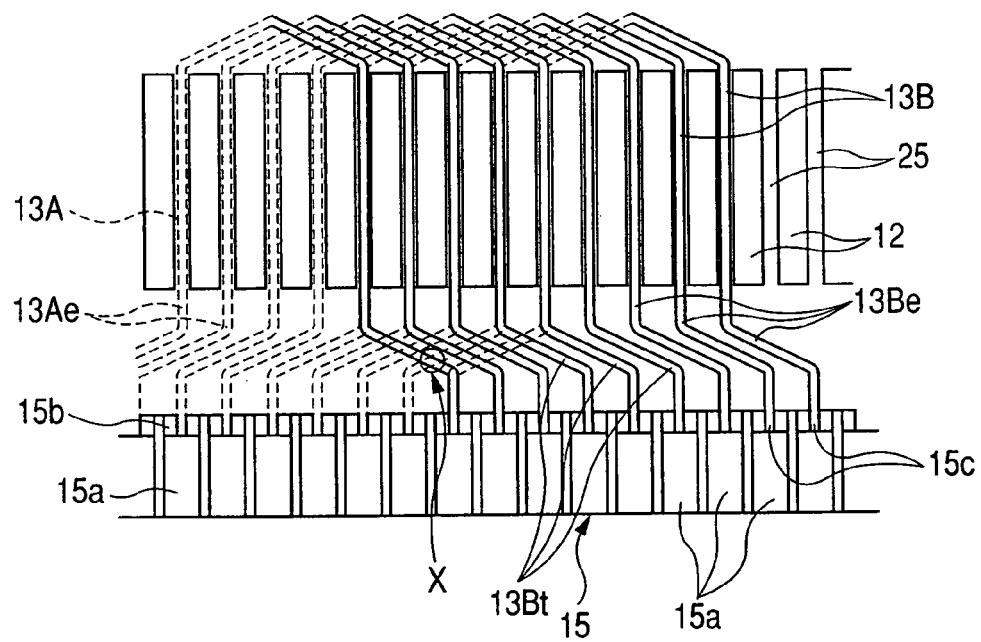
FIG. 5 is a schematic view showing a connection diagram of an armature coil.

The lower layer coil 13A and the upper layer coil 13B, inserted to the same slot 25 of the armature core 12, are extracted from the associated slot 25 in an axial direction as the lower layer coil extension 13Ae and the upper layer coil extension 13Be and subsequently bent in circumferentially opposite directions upon which the lower layer coil 13A and the upper layer coil 13B are connected to different conductor segments 15a of the commutator 15 as shown in FIG. 5. With such configuration, the lower layer coil 13A and the upper layer coil 13B, extracted from the associated slots 25 of the armature core 12 in the axial direction, have circumferentially bent portions that intersect with each other at an intersecting region (designated at a section "X" in FIG. 5).

Figure 4:
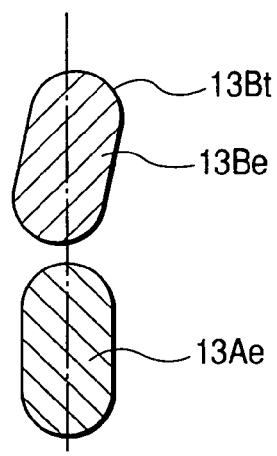
FIG. 4 is a cross-sectional view, taken on line A-A of FIG. 3, of upper and lower layer coil extensions forming part of the armature shown in FIG. 3.

At least one of the lower and upper layer coil extensions 13Ae, 13Be of the lower layer coil 13A and the upper layer coil 13B has a contour deformation part at the intersecting region X where the upper layer coil extension 13Be and the lower layer coil extension 13Ae intersect with each other. That is, as shown in FIG. 4, the upper layer coil extension 13Be has an intermediate portion formed with the contour deformation part 13Bt. The contour deformation part 13Bt comprises a twisted portion that is twisted at the intermediate position of the upper layer coil extension 13Be in one orientation to cause a major axis of the upper layer coil extension 13Be to be inclined with respect to a radial direction of the armature core 12. Then, the twisted portion is twisted back to an original orientation so as to enter the slot 15c of the riser 15b of the conductor segment 15a such that the major axis of the upper layer coil extension 13Be is aligned with a major axis of the lower layer coil extension 13Ae in matching with the radial direction of the armature core 12.

Now, the operation of the starter 1 is explained.

As the starter switch is closed and the electromagnetic coil of the electromagnetic switch 8 is energized to form the electromagnet, the electromagnet attracts the plunger that is consequently moved rightward as viewed in FIG. 1. At this moment, the motion of the plunger is transferred to the clutch 5 via the shift lever 7 and the clutch 5 and the pinion gear 6 integrally move on the output shaft 4 in the forward direction to be away from the motor 2. Thus, an end face of the pinion gear 6 is brought into abutting engagement with an end face of the ring gear and stopped in a fixed place.

In the meanwhile, as the plunger moves and the main contact of the motor circuit is closed, the motor 2 is supplied with electric power from the on-vehicle battery to cause the armature 14 to generate a rotational force. The rotational speed of the armature 14 is reduced with the reduction gear unit 3 and transferred to the output shaft 4 as drive torque, from which drive torque is further transmitted to the pinion gear 6 via the clutch 5. As a result, the pinion gear 6 is forcibly rotated to a position where the pinion gear 6 is possible to be brought into meshing engagement with the ring gear to transfer drive torque of the motor 2 to the ring gear via the pinion gear 6, thereby cranking up the engine.

As the engine starts up on cranking operation and the starter switch is opened, the electromagnetic coil is de-energized to distinguish the attraction force. This allows a reaction force of the return spring to push the plunger back to the original position. At this moment, the main contact is opened interrupting the supply of electric power to the motor 2 from the on-vehicle battery and, thus, the rotation of the armature 14 is gradually decreased in speed and stopped.

Further, as the plunger is pushed back, the shift lever 7 is caused to swing in a direction opposite to that in which the shift lever 7 swings during startup of the engine, with the motion of the plunger being transferred to the clutch 5. As a result, the pinion gear 6 disengages from the ring gear of the engine and the pinion gear 6 and the clutch 5 axially move rearward on the output shaft 4 in a unitary manner to a given position (that is, to a position as shown in FIG. 1) and stopped in startup operation.

Advantageous Effect of First Embodiment

With the starter 1 set forth above, since at least one (that is, the upper coil layer 13BBe with the present embodiment) of the upper and lower layer coil extensions 13Be, 13Ae, extracted from the slot 25, includes the twisted portion 13Bt as the contour deformation part at the intersecting region X where the lower and upper layer coil extensions 13Ae, 13Be intersect with each other, an insulating distance can be adequately provided between the lower layer coil extension 13Ae and the upper layer coil extension 13Be at the intersecting region X (see FIG. 4). This makes it possible for the armature coil 13 to use a flat type wire with an increased thickness or a vertically long flat type wire, enabling the realization of the starter 1 in a minimized structure with lightweight.

With the starter 1 of the first embodiment according to the present invention, no stepped portions need to be formed on the upper and lower layer coil extensions by press punching operation at an intersecting region where the upper and lower layer coil extensions intersect with each other. Thus, the lower layer coil extension 13Ae and the upper coil layer 13BBe have no fear of having burrs resulting from press punching operation and no need occurs for removing the burrs from the coils, making it possible to achieve a reduction in man-hour requirement.

Further, due to no need arising for the stepped portions to be formed on the lower layer coil extension 13Ae and the upper layer coil extension 13Be at the intersecting region where the lower layer coil extension 13Ae and the upper layer coil extension 13Be intersect with each other, no remarkable reduction takes place in cross-sectional areas of both the upper layer coil extensions 13Ae, 13Be at the intersecting region. That is, the lower layer coil extension 13Ae has an overall length with the same cross-sectional area as those of fore and aft areas at the intersecting region where the lower layer coil extension 13Ae and the upper layer coil extension 13Be intersect with each other. Likewise, the upper layer coil extension 13Be has an overall length with the same cross-sectional area as those of fore and aft areas at the intersecting region where the lower layer coil extension 13Ae and the upper layer coil extension 13Be intersect with each other. This results in no probability for remarkable reductions to take place in the cross-sectional areas of both the upper layer coil extensions 13Ae, 13Be at the intersecting region, enabling the suppression of a heating value. Accordingly, a drop in the output voltage of the starter 1 can be minimized, making it easy to achieve a design of the motor 2 with increased heat-resistant property.

Modified Form of First Embodiment

Now, a starter of a modified form of the first embodiment is described with reference to FIGS. 6A and 6B. FIG. 6A is an enlarged cross-sectional view partly showing an armature 14A forming part of the starter of the modified form of the first embodiment, wherein the slot 15c of the riser 15b of the conductor segment 15a accommodates therein the coil end portions 13a, 13b of the lower layer coil extension 13Ae and the upper layer coil extension 13Be, and FIG. 6B is a cross-sectional view showing coil end portions 13a, 13b.

The starter of the modified form of the first embodiment is described below with reference to an exemplary structure wherein the coil end portions 13a, 13b of the lower layer coil extension 13Ae and the upper layer coil extension 13Be inserted to the slot 15c of the riser 15b are bonded to each other by fusing.

Prior to fusing the coil end portions 13a, 13b of the lower layer coil extension 13Ae and the upper layer coil extension 13Be inserted to the slot 15c of the riser 15b, partial areas of insulating films covering the coil end portions 13a, 13b are preliminarily removed. More particularly, as shown in FIG. 6B, a bottom area IFa of the insulating film covering the coil end portion 13a of the lower layer coil 13A is removed such that the coil end portion 13a has a flat bottom surface. Likewise, an upper area IFb of the insulating film covering the coil end portion 13b of the upper layer coil extension 13Be is removed such that the coil end portion 13b has a flat upper surface. In other words, the coil end portions 13a, 13b of the lower layer coil extension 13Ae and the upper layer coil extension 13Be have areas, facing each other in the slot 15c of the riser 15b, in which the insulating films are left, respectively. Consequently, both the coil end portions 13a, 13b of the lower layer coil extension 13Ae and the upper layer coil extension 13Be are inserted to the slot 15c of the riser 15b of each conductor segment 15a with non-bonding portions of the coil end portions 13a, 13b at areas covered with the insulating films being held in abutting engagement with each other as shown in FIG. 6A. Under such placement condition, the insulating films of the coil end portions 13a, 13b are melted by fusing and electrically and mechanically bonded to each other.

Figure 8A:
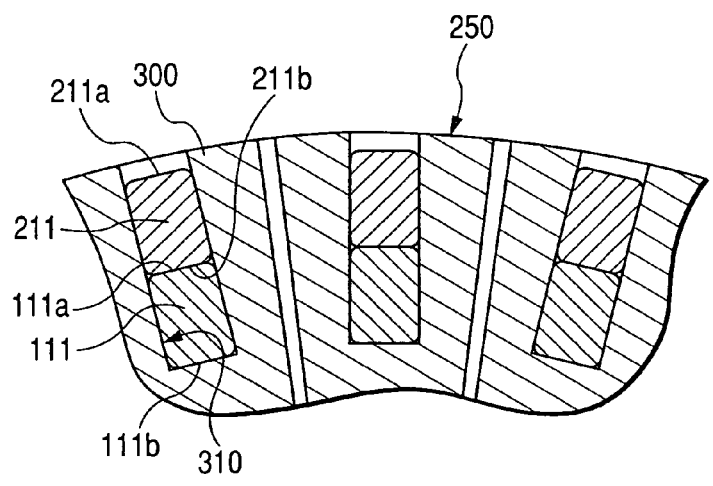
FIG. 8A is an enlarged cross-sectional view of an armature forming an electric rotary machine of another related art.
Figure 8B:
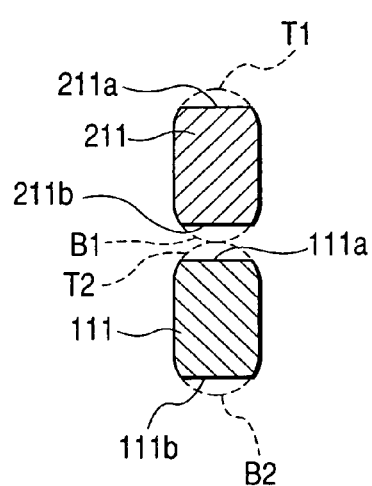
FIG. 8B is a cross-sectional view of distal ends of the upper and lower layer coil extensions forming part of the armature shown in FIG. 8A.

By the way, with the related art structure mentioned above, as shown in FIGS. 8A and 8B, the lower layer coil end portion 111 has top and bottom end walls 11a, 111b whose insulation films are preliminarily removed. Likewise, the upper layer coil end portion 211 has top and bottom end walls 211a, 211b whose insulation films are preliminarily removed. Subsequently, both the coil end portions 111, 211 are inserted to the slot 310 of the riser 300 of the conductor segment under a status where the top end wall 111a of the lower layer coil end portion 111 and the bottom end wall 211b of the upper layer coil end portion 211 are held in abutting engagement with each other. With such a condition, the top end wall 111a of the lower layer coil end portion 111 and the bottom end wall 211b of the upper layer coil end portion 211 are electrically and mechanically bonded to each other by fusing. With such a related art structure, preliminarily removing the insulating film T2 of the top end wall 111a of the lower layer coil end portion 111 and the insulating film B1 of the bottom end wall 211b of the upper layer coil end portion 211 results in a narrowed minimal clearance between the upper and lower layer coils 211, 111 at an intersection section where the upper and lower layer coils 211, 111 are closest to each other.

On the contrary, with the structure of the armature of the modified form of the first embodiment, since the insulating films remain on the opposing end walls of the both coil end portions 13a, 13b whose major axes are disposed in the slot 25 in alignment with the radial direction of the armature 14A, a widened clearance can be ensured between the lower layer coil extension 13Ae and the upper layer coil extension 13Be at the intersecting region where the lower layer coil extension 13Ae and the upper layer coil extension 13Be are closest to each other. By doing so, no need arises for the flat type wire to be intentionally formed in a particular propensity punched configuration as required in the related art structure for the purpose of getting an insulating distance between the lower layer coil extension and the upper layer coil extension and the insulating distance can be easily obtained at the intersecting region where the lower layer coil extension and the upper layer coil extension intersect with each other.

Further, since the lower layer coil extension 13Ae and the upper layer coil extension 13Be have opposing walls covered with the respective insulating films at the intersecting region where the lower layer coil extension 13Ae and the upper layer coil extension 13Be are closest to each other, a slight amount of insulating distance can be suffice to be ensured in a space between the lower layer coil extension 13Ae and the upper layer coil extension 13Be at the intersecting region. Thus, the armature of the starter of the present embodiment can have stabilized quality in clearance between the lower layer coil extension 13Ae and the upper layer coil extension 13Be. Therefore, no need arises for an interlayer-insulating sheet to be interposed between the lower layer coil extension 13Ae and the upper layer coil extension 13Be.

While the modified form of the first embodiment can be implemented alone, it will be appreciated that the first and second embodiments may be implemented in combination if desired.

Second Embodiment

Now, an armature of a starter of a second embodiment according to the present invention is described with references to FIGS. 9 to 15. The armature of the second differs from the first embodiment in that a contour deformation part of an upper layer coil extension is composed of a bent portion formed at an intersecting region where the upper layer coil extension and a lower upper layer coil extension intersect with each other. Also, the second embodiment is directed to a forming machine for forming the bent portion on the upper layer coil extension extracted from a slot of an armature core forming part of the armature.

Figure 9:
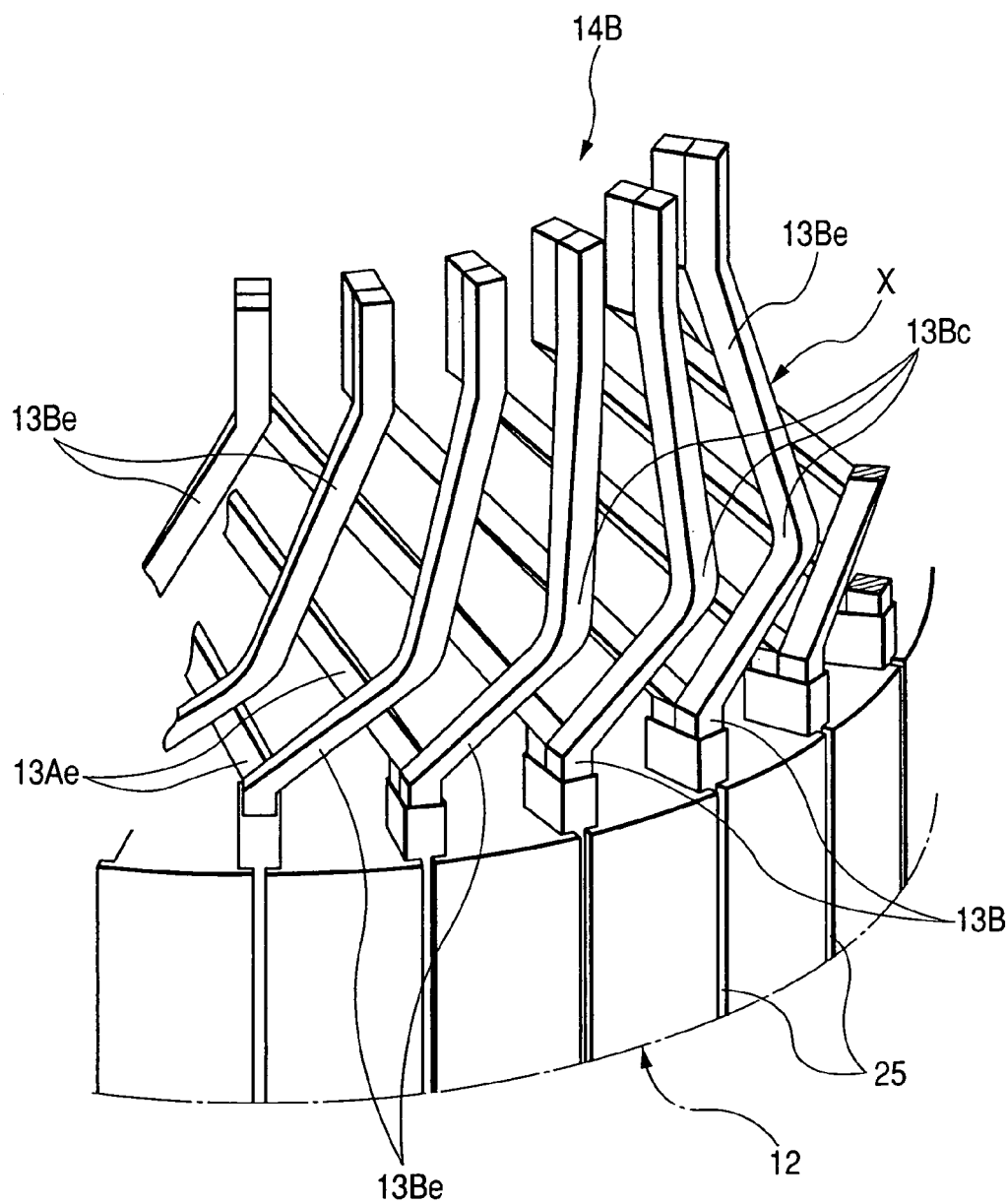
FIG. 9 is an enlarged perspective view of an armature forming an electric rotary machine of a second embodiment according to the present invention with upper and lower layer coil extensions extracted from associated slots of an armature core.

FIG. 9 is a perspective view showing the armature forming part of the starter of the second embodiment. FIGS. 10 to 15 are views showing the forming machine for the armature of the second embodiment according to the present invention.

With the starter of the present embodiment, the armature 14B is rotatably supported within the yoke 9 of the starter 1 like the structure shown in FIG. 1.

The armature 14B is comprised of the armature shaft 11, the armature core 12 fixedly mounted on the armature shaft 11, the plural armature coils 13 wound on the armature core 12, and the commutator 15 fixedly mounted on the armature shaft 11 at one end thereof on the same structure as that shown in FIG. 1.

The armature core 12 also has the axially extending slots 25 (twenty five slots in the structure shown in FIG. 9) that are equidistantly placed along the circumferential periphery of the armature core 12 as shown in FIG. 9. The slots 25 are formed on the armature core 12 in an entire axial length thereof.

The armature coil 13 is composed of the insulator-coated copper wire and wounded on the armature core 12 such that the insulator-coated copper wire is inserted to the slot 25 of the armature core 12 in upper and lower layers. The armature coil 13 has the lower layer coil 13A and the upper layer coil 13B that have lower and upper layer coil extensions 13Ae, 13Be, respectively, extracted from one end of the slot 25 of the armature core 12 and having the distal coil ends 13a, 13b connected to the commutator 15 (see FIGS. 1 and 2).

With the armature 14B of the second embodiment, as shown in FIG. 9, the lower coil 13A and the upper coil layer 13BB are disposed in the slot 25 of the armature core 12 in lower and upper layers and lower and upper layer coil extensions 13Ae, 13Be are extracted from one end of the armature core 12. The lower and upper layer coil extensions 13Ae, 13Be are bent in opposite directions on the circumferential periphery of the armature core 12 for connection to different conductor segments and intersect with each other at the intersecting region X in the same structure as that shown in FIG. 5 described with reference to the first embodiment.

At the intersecting region X where the upper and lower layer coil extensions 13Be, 13Ae of the upper layer coil 13B and the lower layer coil 13A intersect with each other, the upper and lower layer coil extensions 13Be, 13Ae of the upper layer coil 13B and the lower layer coil 13A come close to each other with the occurrence of less insulating distance between the upper and lower layer coil extensions 13Be, 13Ae. To address such an issue, at least one (that is, the upper layer coil extension 13Be with the present embodiment) of the upper layer coil extensions 13Be, 13Ae has a contour deformation part composed of a curvature portion 13Bc formed at an intersecting region (like the intersecting region X shown in FIG. 5) where the upper layer coil extension 13Be and the lower layer coil extension 13Ae intersect with each other. The provision of the contour deformation part composed of the curvature portion 13Bc on the upper layer coil extension 13Be allows an adequate insulating distance to be ensured between the upper layer coil extension 13Be and the lower layer coil extension 13Ae with no need to perform press punching operations for stepped portions to be formed on the upper layer coil extension 13Be and the lower layer coil extension 13Ae.

With the second embodiment, such a contour deformation part of the upper layer coil extension 13Be is formed using a forming machine 30 shown in FIGS. 10 to 15.

More particularly, the forming machine 30 is configured in structure to form the curvature portion 13Bc on the upper layer coil extension 13Be of the upper coil layer 13B with the commutator 15 fixedly supported on the armature shaft 11, that is, with the lower layer coil extension 13Ae and the upper layer coil extension 13Be extracted from the slot 25 of the armature core 12 in an axial direction.

Figure 10:
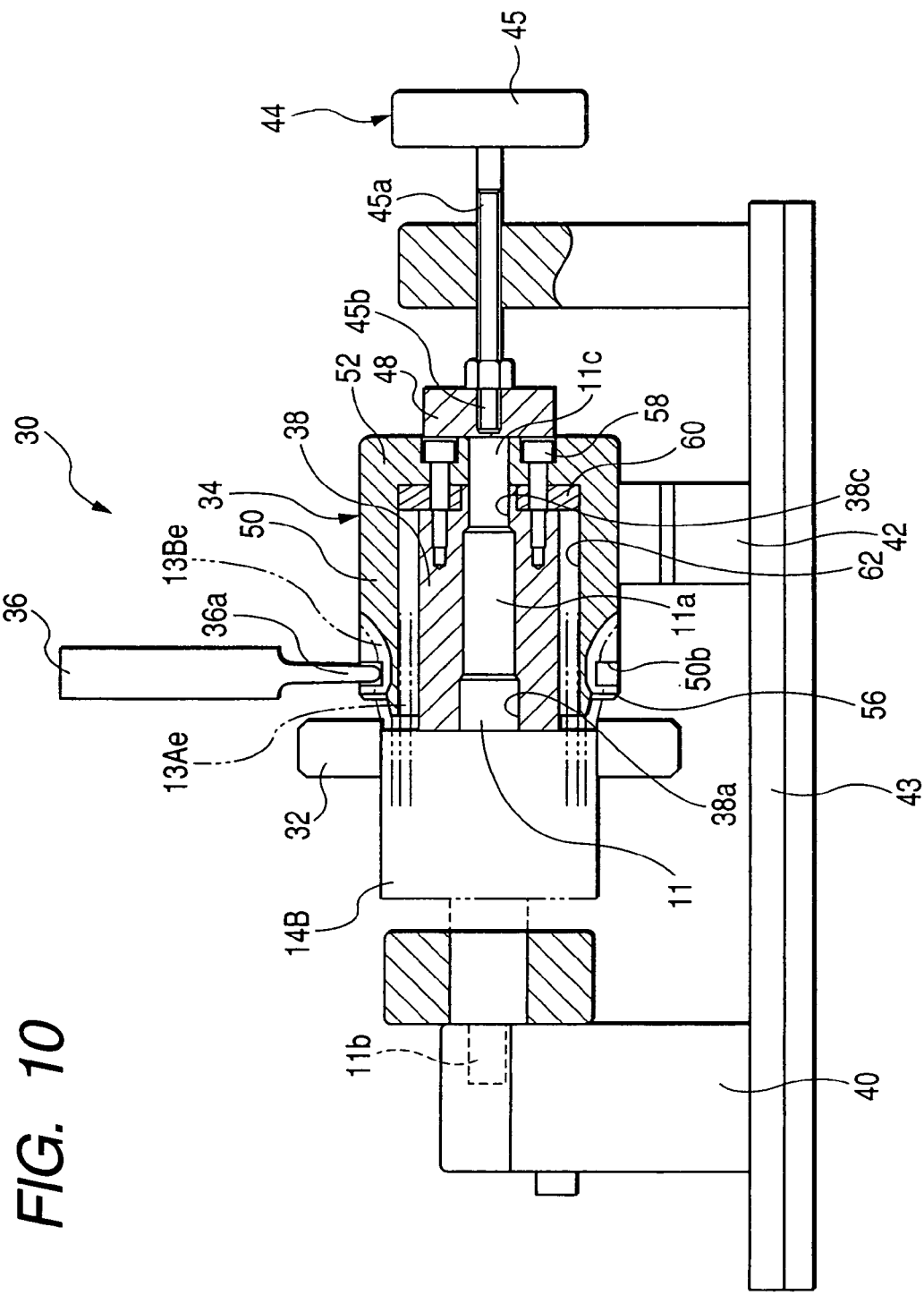
FIG. 10 is a schematic view showing an overall structure of an armature forming machine for forming the armature shown in FIG. 9.

Referring to FIG. 10, the forming machine 30 is shown including a work holder mechanism 31, a coil restraint ring 32, a forming jig 34, a press punch 36 and an inner jig 38.

The work holder mechanism 31 is comprised of one set of workpiece receivers 40, 42 standing upright from a base 43, and a tightening mechanism 44.

The one set of workpiece receivers 40, 42 include the workpiece receiver 40 that supports a forward end 11b of the armature shaft 11 at a position in opposition to the commutator, and the workpiece receiver 42 that supports the rear end 11b of the armature shaft 11 via the forming jig 34 at a position closer to the commutator.

The tightening mechanism 44 includes a tightening handle 45, a tightening stand 46 standing upright from the base 43 at a rear end portion thereof, a tightening screw 45a extending forward through the tightening stand 46 from the tightening handle 45, and a tightening member 48 fixedly secured to a rear end face of the forming jig 34. Rotating the tightening handle 45 to cause a front end 45b of the tightening screw 45a to press an end face of the rearmost end 11c of the armature shaft 11, thereby holding the armature shaft 11 at a fixed position in an axial direction.

Figure 11:
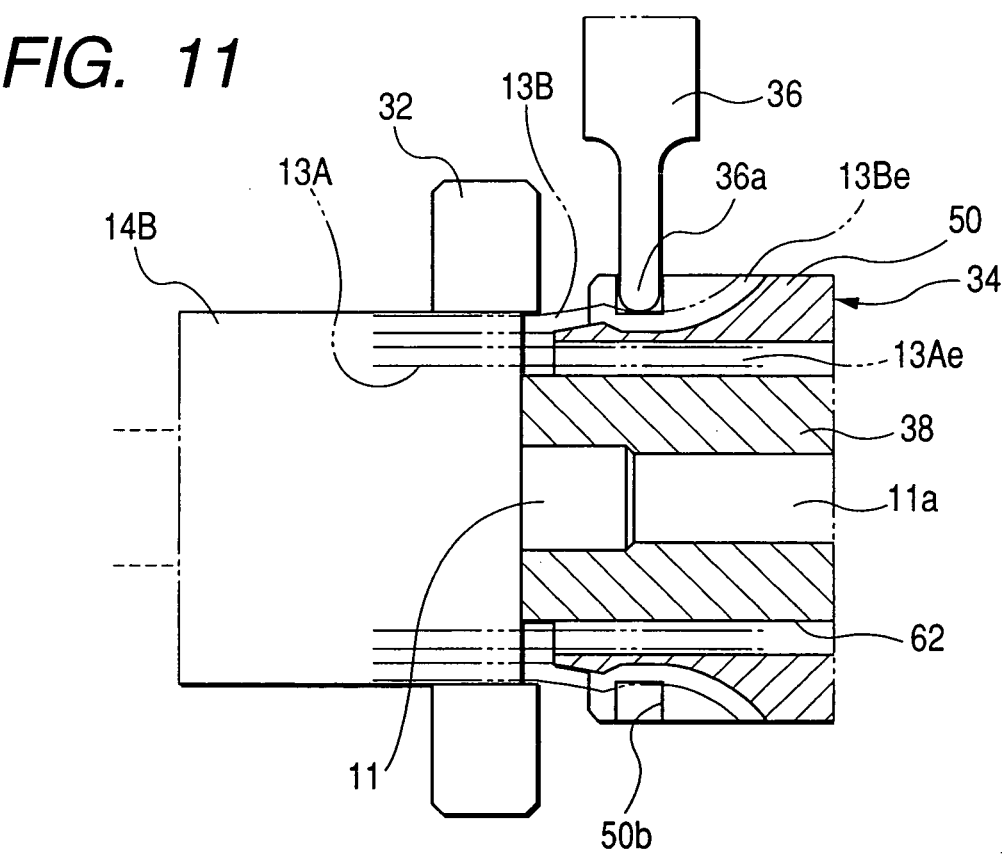
FIG. 11 is an enlarged cross-sectional view an operational relationship between a coil restraint ring and a forming jig of the armature forming machine shown in FIG. 10.
Figure 12:
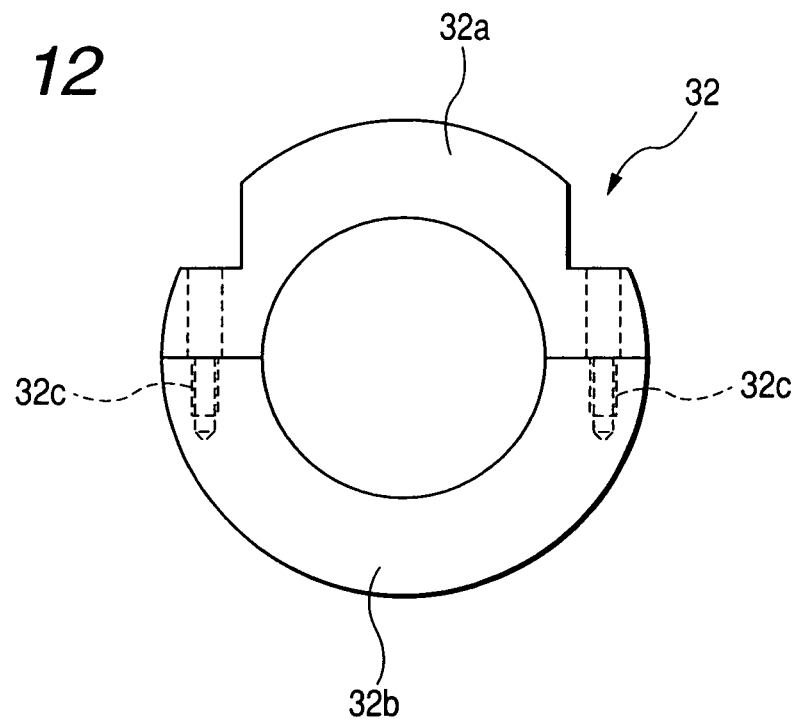
FIG. 12 is a plan view of the coil restraint ring shown in FIG. 11.

As shown in FIG. 11, the coil restraint ring 32 is placed on outer peripheries of the upper layer coils 13B at a position immediately after the upper layer coil extensions 13Be extend from the slots 25 in the axial direction and restrains the outer peripheries of the upper coils 13B so as to prevent the upper layer coils 13B from lifting up in a radially outward direction during the formation of the curvature portions 13Bc. As shown in FIG. 12, the coil restraint ring 32 is comprised of upper and lower semicircular halves 32a, 32b that are coupled into one piece by means of plural screws 32c, 32c.

Figure 13B:
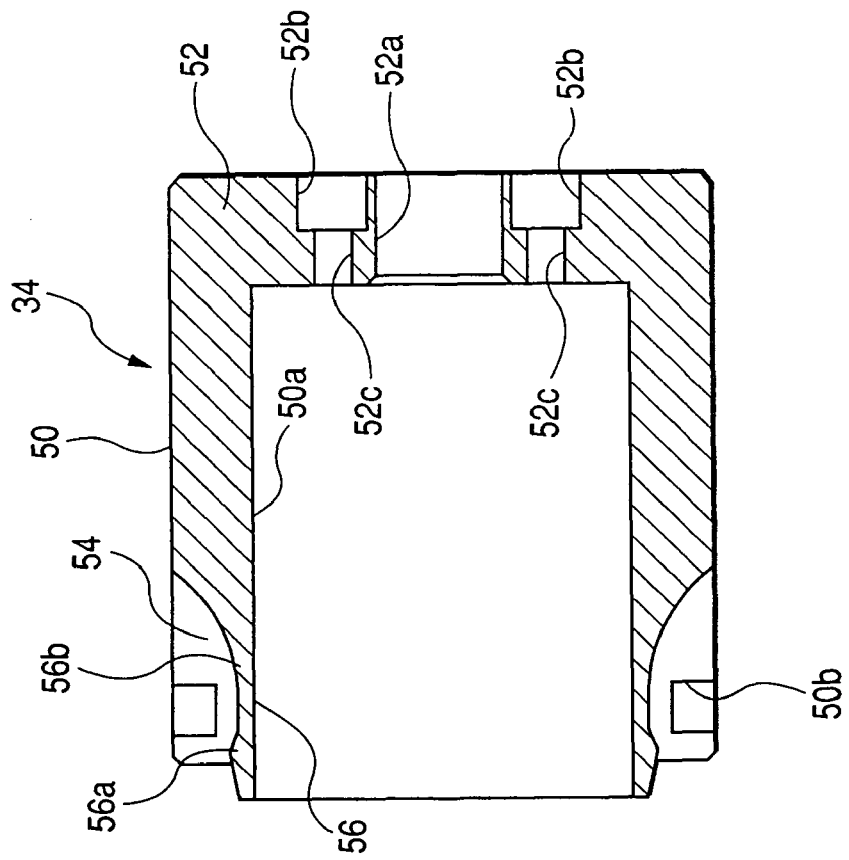
FIG. 13B is a cross-sectional view of the forming jig shown in FIG. 13A.
Figure 13A:
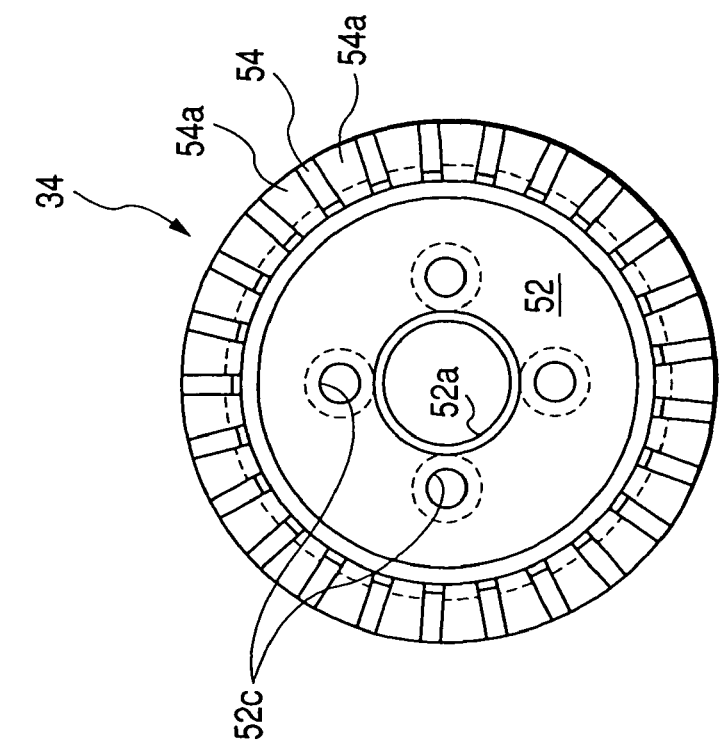
FIG. 13A is a front view of the forming jig of the armature forming machine shown in FIG. 10.
Figure 14:
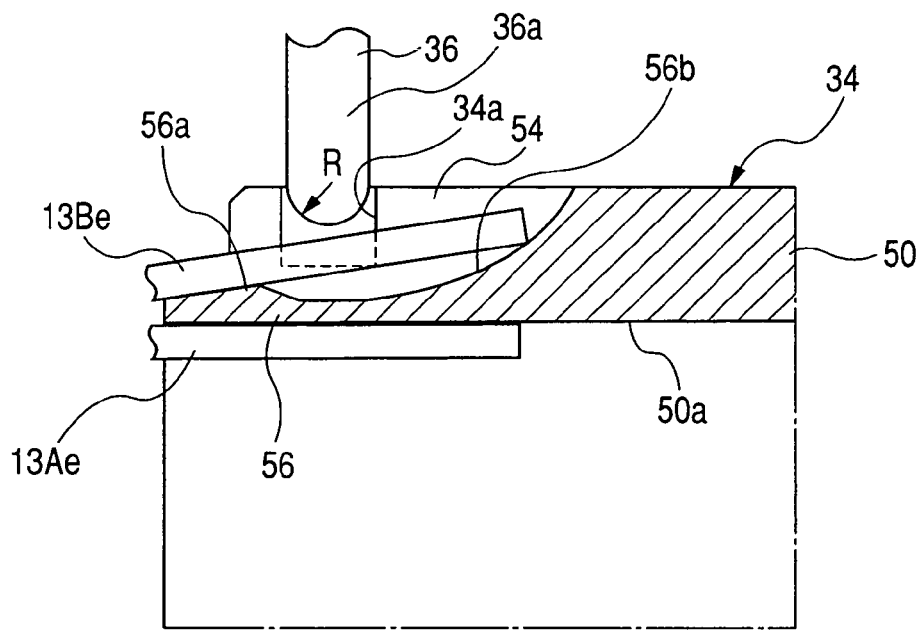
FIG. 14 is an enlarged cross-sectional view showing a step of forming a contour deformation part on an upper layer coil extension before a press punch is brought into contact with an upper periphery of the upper layer coil extension.

As shown in FIG. 13A, the forming jig 34 is comprised of a cylindrical member 50 with one end closed at a bottom wall 52. The cylindrical member 50 has an axially extending cylindrical inner bore 50a and a front end portion formed with a plurality of axially extending coil insertion recesses 54 in number equal to the number of the slots 25 that are formed at equidistantly spaced positions along a circumferential periphery of the cylindrical member 50 for retaining the upper layer coil extensions 13Be of the upper layer coils 13B extracted from the slots 25 of the armature core 12.

As shown in FIG. 13B, each coil insertion recess 54 is associated with an insertion tongue 56 formed on the front end of the cylindrical member 50. The insertion tongue 56, axially extending to play a role as a bottom wall of the coil insertion recess 54, has a forming portion 56a, adapted to be inserted to a clearance between the lower layer coil extension 13Ae and the upper layer coil extension 13Be in the axial direction, and wall portions 54a radially extending outward on both circumferential sides of the coil insertion recess 54. The forming portion 56a is formed of an outer periphery of the insertion tongue 56 formed in a ridge shape. The insertion tongue 56 is formed in a tapered profile that gradually decreases in radial thickness toward a front distal end of the forming portion 56a. The insertion tongue 56 also has a rear curved slope portion 56b contiguous with the forming portion 56a to form the curvature portion 13Bc on the upper layer coil extension 13Be in a final shape. Moreover, the forming jig 34 has a front area formed with a plurality of radially extending punch guide recesses 50b at a position close proximity to the forming portion 56a of the insertion tongue 56. The bottom wall 52 of the forming jig 34 has a central bore 52a, through which the extreme end 11c of the armature shaft 11 extends, a plurality of bolt head bores 52b and a plurality of bolt insertion bores 52c through which fixture bolts 58 extend, respectively.

The press punch 36, placed in a position radially outward of the upper layer coil extension 13Be of the upper coil layer 13B retained in the coil insertion recess 54, has a lower distal end 36a inserted through the guide recess 50b of the cylindrical member 50 of the forming jig 34. The distal end 36a of the press punch 36 has a bottom end protruding into the coil insertion recess 54 and when pressed, the distal end 36a of the press punch 36 is pressed against the upper layer coil extension 13Be of the upper coil layer 13BB.

With the press punch 36, the distal end 36a has a bottom end formed in a round R-shape to be pressed against the upper layer coil extension 13Be and has a given width in a circumferential direction. The width of the distal end 36a of the press punch 36 is selected to have a size such that the distal end 36a of the press punch 36 can be inserted to the guide recess 50b of the forming jig 34 and is greater than a circumferential width of the upper layer coil extension 13Be.

Turning back to FIG. 10, the inner jig 38 has a cylindrical outer configuration and inner bores 38a, 38b, 38c for accommodating the armature shaft 11, the end portion 11a and the extreme end portion 11c, respectively. The inner jig 38 is accommodated in the cylindrical bore 34a and fixedly supported therein via an annular support plate 60 fitted to the cylindrical bore 34a of the forming jig 34 by means of the fixture bolts 58 supported on the bottom wall 52 of the forming jig 34, with a given annular guide space 62 defined between the cylindrical wall 34a of the forming jig 34 and the outer cylindrical surface of the inner jig 38. With such a structure, the inner jig 38 is inserted to an area radially inward of the lower layer coil extension 13Ae and plays a role as a restraint means to restrain the inner periphery of the lower layer coil extension 13Ae when the insertion tongue 56 is inserted to a clearance between the lower and upper layer coil extensions 13Ae, 13Be.

Next, description is made of a method of forming the curvature portion 13Bc on the upper layer coil extension 13Be using the forming machine 30.

Initially, the forming jig 34 and the inner jig 38 are inserted to the lower layer coil extension 13Ae and the upper layer coil extension 13Be extracted from the associated slot 25 of the armature core 12 in the axial direction of the armature 14. That is, the inner jig 38 is inserted to a radially inward area of the lower layer coil extension 13Ae. Also, the insertion tongue 56 is inserted to the clearance between the lower layer coil extension 13Ae and the upper layer coil extension 13Be. Under such a condition, the upper layer coil extension 13Be intrudes into the coil insertion recess 54 of the forming jig 34 and is fixedly retained in a fixed place.

Figure 15:
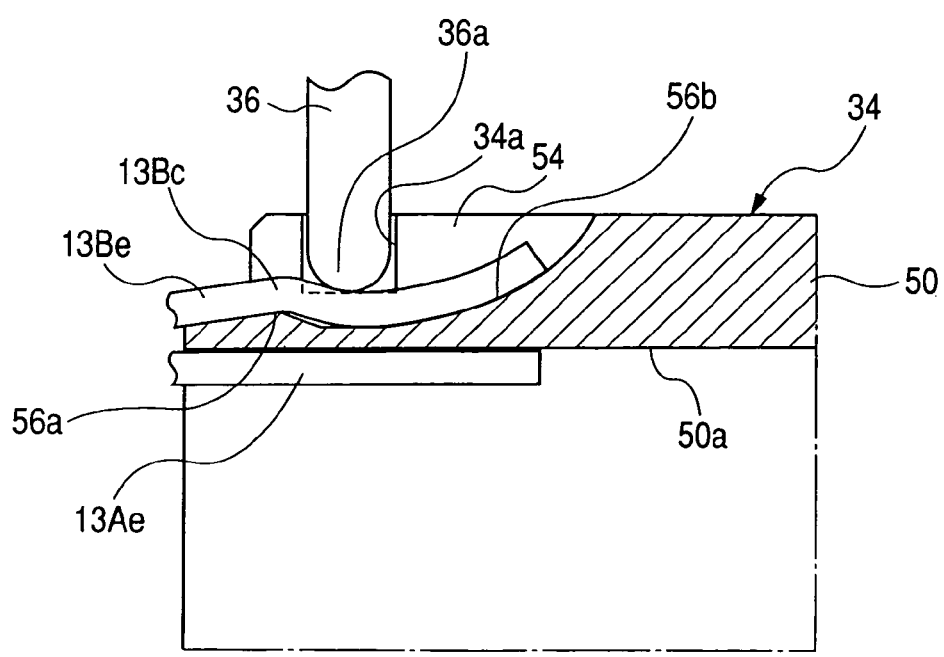
FIG. 15 is an enlarged cross-sectional view showing the step of forming the contour deformation part on the upper layer coil extension after the press punch is under operation to form the contour deformation part on the upper layer coil extension.

Subsequently, the coil restraint ring 32 is positioned at and mounted on a corner area of the outer periphery of the armature core 12, thereby restraining the outer peripheries of the upper layer coil extensions 13Be at a position immediately extending from the associated slots 25 of the armature core 12. Then, the insertion tongue 56 of the forming jig 34 is inserted to between the upper and lower layer coil extensions 13Ae, 13Be, while permitting the upper layer coil extension 13Be to be guided into and fixedly retained in the coil insertion recess 54. Thereafter, the press punch 36 is radially pressed inward through the punch guide recess 50b to cause the distal end 36a to be pressed against the upper layer coil extension 13Be. By doing so, the upper layer coil extension 13Be is formed with the curvature portion 13Bc as the contour deformation part following the shape of the forming portion 56a of the forming jig 34 as shown in FIG. 15.

Upon completion of press punching operation to form the curvature portion of the upper layer coil extension 13Be, the armature core 12 and the forming jig 34 are rotated by a rotational angle equivalent to one slot. With such a status, lowering the press punch 36 allows a subsequent step to be carried out to from another curvature portion 13Bc on another upper layer coil extension 13Be. Subsequent steps are carried out in such a sequence, thereby forming the curvature portions on the upper layer coil extensions 13Be.

Advantageous Effects of Second Embodiment

With the armature 14B of the present embodiment mentioned above, the curvature portion 13Bc is formed on the upper layer coil extension 13Be at the intersecting region X where the lower and upper layer coil extensions 13Ae, 13Be intersect with each other. Thus, a sufficient air gap can be ensured as an insulating distance between the lower and upper layer coil extensions 13Ae, 13Be. Moreover, the curvature portion 13Bc of the upper layer coil extension 13Be is plastically deformed in a curved shape following the shape of the forming portion 56a, no insulating film is peeled off. Accordingly, no need arises for an excessive amount of insulating distance to be provided between both of the upper and lower layer coil extensions 13Be, 13Ae at the intersecting region X where the lower and upper layer coil extensions 13Ae, 13Be intersect with each other. This enables the curvature portion 13Bc to be formed in a minimized profile, resulting in a reduction of stress acting on the upper layer coil extension 13Be.

With the forming machine 30 set forth above, no need arises for conducting press punching operation with the use of a punching press machine to form stepped portions on the lower and upper layer coil extensions 13Ae, 13Be at areas corresponding to the intersecting region X. Thus, the lower and upper layer coil extensions 13Ae, 13Be have no burrs resulting from punching operations and various issues caused by the occurrence of the burrs can be easily addressed.

Further, the forming machine 30 is equipped with the coil restraint ring 32 that can restrains the outer periphery of the upper layer coil extension 13Be at a position immediately extracted from the associated slot 25. Such a structure prevents the upper layer coil extension 13Be from floating in a radially outward direction due to reactive action of the same when the upper layer coil extension 13Be is pressed with the distal end 36a of the press punch 36. This enables the upper layer coil extension 13Be from being brought into electrical contact with the armature core 12 (for connection to the ground).

Furthermore, since the forming machine 30 is equipped with the tightening mechanism 44 to press the armature shaft 11 in the axial direction thereof, no axial displacement of the armature core 12 takes place during a stage when forming the curvature portion 13Bc on the upper layer coil extension 13Be using the press punch 36. That is, the curvature portion 13Bc can be formed on the upper layer coil extension 13Be with the upper layer coil extension 13Be fixedly retained in a given axial position. Thus, the curvature portion 13Bc can be formed on the upper layer coil extension 13Be following the shape of the forming porting 56a of the forming jig 34 in a highly efficient and reliable fashion.

Moreover, due to the provision of the forming jig 34 having the coil insertion recesses 54 each between the adjacent wall surfaces 54a, 54a and the insertion tongue 56, the upper layer coil extension 13Be can be reliably retained in the coil insertion recess 54. Thus, the upper layer coil extension 13Be can withstand on a stable attitude, making it easy to form the curvature portion 13Bc on the upper layer coil extension 13Be in a high reliable manner.

In addition, the insertion tongue 56 of the forming jig 34 has a tapered guide wall that gradually decreases in radial thickness from a tip of the insertion tongue 56 toward a distal end thereof. This results in a decrease in contact resistance between the upper layer coil extension 13Be and the insertion tongue 56 during operation when the insertion tongue 56 is inserted to the clearance between the lower and upper layer coil extensions 13Ae, 13Be. This makes it possible to allow the insertion tongue 56 to be easily inserted to the clearance between the lower and upper layer coil extensions 13Ae, 13Be.

Moreover, during the operation to insert the insertion tongue 56 to the clearance between the lower and upper layer coil extensions 13Ae, 13Be, the lower layer coil extension 13Ae is inserted to the annular guide space 62 defined between an inner wall of the cylindrical bore 50a and an outer periphery of the inner jig 38. This enables the inner jig 38 to restrict the inner periphery of the lower layer coil extension 13Ae, making it possible to prevent the lower layer coil extension 13Ae from collapsing radially inward.

Further, with the forming machine 30, the distal end 36a of the press punch 36 for pressing the upper layer coil extension 13Be is formed in the R-shape. With such a configuration, the distal end 36a of the press punch 36 can have a minimal contact surface area in contact with the upper layer coil extension 13Be, resulting in reduction of deterioration in insulating quality of the upper layer coil extension 13Be. Furthermore, the presence of the R-shape formed on the distal end 36a of the press punch 36 enables the suppression of stress concentration on the distal end 36a of the press punch 36, thereby preventing crack or chip from occurring on the distal end 36a of the press punch 36. Moreover, with a structure wherein the width of the distal end 36a of the press punch 36 determined to be greater than the circumferential width of the upper layer coil extension 13Be, the distal end 36a of the press punch 36 can be pressed against the upper layer coil extension 13Be in an entire circumferential width thereof, preventing the occurrence of partial deformation of the upper layer coil extension 13Be and deterioration in insulating quality thereof.

Modified Form of Second Embodiment

While the present embodiment has been described above with reference to one example wherein the upper layer coil extension 13Be has the curvature portion 13Bc as the contour deformation part, an alternative may be possible to allow the lower layer coil extension 13Ae to have a curvature portion as a contour deformation part in shape similar to the curvature portion 13Bc of the upper layer coil extension 13Be. In another alternative, both the lower and upper layer coil extensions 13Ae, 13Be may have the curvature portions, respectively, like the curvature portion 13Bc.

While the forming machine 30 of the present embodiment has been set forth above with reference to a structure employing a single press punch 36, the forming machine 30 may be structured so as to have a plurality of press punch 36 in association with a whole of the coil insertion recesses 54 of the forming jig 34. With such an alternative, curvature portions 13Bc can be formed on all of the upper layer coil extensions 13Be of the upper coils 13B at one time, resulting in an increased efficiency of forming operation.

Also, the forming portion 56a of the insertion tongue 56 may be altered such that the forming portion 56a has a shape in consideration of spring-back action of the upper layer coil extension 13Be occurring when the press punch 36 presses against the upper layer coil extension 13Be.

Moreover, the forming machine 30 may be altered in structure so as to allow an outer periphery of the forming jig 34 to be formed with a punching guide recess to guide the press punch 36 to a given position. With such an alternative, the positioning of the press punch 36 can be easily achieved and a bending position of the upper layer coil extension 13Be is stabilized.

Besides, while the rotary electric machine of the present invention has been described above with reference to the starter of the various embodiments, it is needless to say that the rotary electric machine of the present invention can be applied to, in addition to the starter, another machine such as a motor or an alternator depending on needs.

While the specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention, which is to be given the full breadth of the following claims and all equivalents thereof.

What is claimed is:
1. An electric rotary machine comprising:
a yoke carrying thereon a plurality of permanent magnets;
an armature core, fixedly supported on an armature shaft and rotatably disposed in the yoke, which has an outer periphery formed with a plurality of slots;
a plurality of insulator-coated armature coils, wound in the slots of the armature core in multiple layers, each of which includes a flat type wire formed in lower and upper layer coils disposed in each of the slots in lower and upper layers; and a commutator fixedly supported on the armature shaft at one end thereof and having a plurality of conductor segments equidistantly disposed on an outer periphery of the armature shaft in a circumferential direction thereof, the conductor segments including risers, respectively, to each of which the lower and upper layer coils are electrically connected;

wherein the lower and upper layer coils include a lower layer coil extension and an upper layer coil extension extracted from each of the slots of the armature core, respectively, and at least one of the lower and upper layer coil extensions includes a contour deformation part, formed in an area at an intersecting region where the lower layer coil extension and the upper layer coil extension intersect with each other, to create an insulating distance between the lower layer coil extension and the upper layer coil extension at the intersecting region thereof, the contour deformation part of the at least one of the lower and upper layer coil extensions includes a curvature portion formed in the area at the intersecting region where the lower layer coil extension and the upper layer coil extension intersect with each other, and the curvature portion includes a plastically deformed portion formed on the at least one of the lower and upper layer coil extensions in a curved shape.

2. The electric rotary machine according to claim 1, wherein:

the riser of each slot has a riser slot that accommodates therein distal ends of the lower and upper layer coil extensions in the upper and lower layers with the distal ends of the lower and upper layer coil extensions having opposing surfaces covered with insulating films, respectively, which are melted by fusing to allow the distal ends of the lower and upper layer coil extensions to be electrically and mechanically bonded to each other.

3. The electric rotary machine according to claim 1, wherein:

the contour deformation part of at least one of the lower and upper layer coil extensions includes a twisted portion formed in the area at the intersecting region where the lower layer coil extension and the upper layer coil extension intersect with each other.

4. The electric rotary machine according to claim 1, wherein:

the lower layer coil extension has a cross-sectional area substantially equal to cross-sectional areas of the lower layer coil extension in fore and aft areas thereof at the intersecting region where the lower layer coil extension and the upper layer coil extension intersect with each other.

5. The electric rotary machine according to claim 1, wherein:

the flat type wire for each of the armature coils is formed by a drawing step.

6. The electric rotary machine according to claim 3, wherein:

the twisted portion of at least one of the lower and upper layer coil extensions has a cross-sectional area having a major axis inclined at a given acute angle with respect to a major axis of a cross-sectional area of the other one of the lower and upper layer coil extensions.

7. An armature for an electric rotary machine, comprising: an armature shaft;

an armature core, fixedly supported on the armature shaft and adapted to be rotatable within the electric rotary machine, which has an outer periphery formed with a plurality of slots;

a plurality of insulator-coated armature coils, wound in the slots of the armature core in multiple layers, each of which includes a flat type wire formed in lower and upper layer coils disposed in each of the slots in lower and upper layers; and a commutator fixedly supported on the armature shaft at one end thereof and having a plurality of conductor segments equidistantly disposed on an outer periphery of the armature shaft in a circumferential direction thereof, the conductor segments including risers, respectively, to each of which the lower and upper layer coils are electrically connected;

wherein the lower and upper layer coils include a lower layer coil extension and an upper layer coil extension extracted from each of the slots of the armature core, respectively, and at least one of the lower and upper layer coil extensions includes a contour deformation part, formed in an area at an intersecting region where the lower layer coil extension and the upper layer coil extension intersect with each other, to create an insulating distance between the lower layer coil extension and the upper layer coil extension at the intersecting region thereof, the contour deformation part of the at least one of the lower and upper layer coil extensions includes a curvature portion formed in the area at the intersecting region where the lower layer coil extension and the upper layer coil extension intersect with each other, and the curvature portion includes a plastically deformed portion formed on the at least one of the lower and upper layer coil extensions in a curved shape.

8. The armature for the electric rotary machine according to claim 7, wherein:

the riser of each slot has a riser slot that accommodates therein distal ends of the lower and upper layer coil extensions in the upper and lower layers with the distal ends of the lower and upper layer coil extensions having opposing surfaces covered with insulating films, respectively, which are melted by fusing to allow the distal ends of the lower and upper layer coil extensions to be electrically and mechanically bonded to each other.

9. The armature for the electric rotary machine according to claim 7, wherein:

the contour deformation part of at least one of the lower and upper layer coil extensions includes a twisted portion formed in the area at the intersecting region where the lower layer coil extension and the upper layer coil extension intersect with each other.

10. The armature for the electric rotary machine according to claim 7, wherein:

the lower layer coil extension has a cross-sectional area substantially equal to cross-sectional areas of the lower layer coil extension in fore and aft areas thereof at the intersecting region where the lower layer coil extension and the upper layer coil extension intersect with each other.

11. The armature for the electric rotary machine according to claim 7, wherein:

the flat type wire for each of the armature coils is formed by a drawing step.

12. The armature for the electric rotary machine according to claim 9, wherein:

the twisted portion of at least one of the lower and upper layer coil extensions has a cross-sectional area having a major axis inclined at a given acute angle with respect to a major axis of a cross-sectional area of the other one of the lower and upper layer coil extensions.

13. A method of manufacturing an electric rotary machine, comprising:

preparing an armature core, fixedly supported on an armature shaft and having an outer periphery formed with a plurality of slots, and a commutator carried on the armature shaft in face-to-face relationship with the armature core, the commutator including a plurality of conductor segments, circumferentially placed in equidistantly spaced positions, which have risers, respectively;

winding a plurality of upper and lower insulator-coated coils in the slots of the armature core in multiple layers such that the upper and lower insulator-coated coils are disposed in each of the slots in upper and lower layers;

extracting the upper and lower insulator-coated coils from the slots of the armature core as upper and lower layer coil extensions, respectively;

forming a contour deformation part in at least one of the lower and upper layer coil extensions in an area at an intersecting region where the lower layer coil extension and the upper layer coil extension intersect with each other to create an insulating distance between the lower layer coil extension and the upper layer coil extension; and electrically connecting distal ends of the lower and upper layer coil extensions to each of the rises of the conductor segments of the commutator, wherein, the contour deformation part of the at least one of the lower and upper layer coil extensions includes a curvature portion formed in the area at the intersecting region where the lower layer coil extension and the upper layer coil extension intersect with each other, and the curvature portion includes a plastically deformed portion formed on the at least one of the lower and upper layer coil extensions in a curved shape.

14. The method of manufacturing the electric rotary machine according to claim 13, wherein:

the riser of each slot has a riser slot that accommodates therein distal ends of the lower and upper layer coil extensions in the upper and lower layers with the distal ends of the lower and upper layer coil extensions having opposing surfaces covered with insulating films, respectively, which are melted by fusing to allow the distal ends of the lower and upper layer coil extensions to be electrically and mechanically bonded to each other.

15. The method of manufacturing the electric rotary machine according to claim 13, wherein:

the contour deformation part of at least one of the lower and upper layer coil extensions includes a twisted portion formed in the area at the intersecting region where the lower layer coil extension and the upper layer coil extension intersect with each other.

16. The method of manufacturing the electric rotary machine according to claim 13, wherein:

the lower layer coil extension has a cross-sectional area substantially equal to cross-sectional areas of the lower layer coil extension in fore and aft areas thereof at the intersecting region where the lower layer coil extension and the upper layer coil extension intersect with each other.

17. The method of manufacturing the electric rotary machine according to claim 13, wherein:

the flat type wire of each of the upper and lower insulator-coated coils is formed by a drawing step.

18. The method of manufacturing the electric rotary machine according to claim 15, wherein:

the twisted portion of at least one of the lower and upper layer coil extensions has a cross-sectional area having a major axis inclined at a given acute angle with respect to a major axis of a cross-sectional area of the other one of the lower and upper layer coil extensions.

* * * * *